US 7,927,573 B2

(12) United States Patent
Degenstein et al.

(10) Patent No.: US 7,927,573 B2
(45) Date of Patent: Apr. 19, 2011

(54) MULTI-STAGE PROCESS FOR PURIFYING CARBON DIOXIDE AND PRODUCING ACID

(75) Inventors: Nick Joseph Degenstein, East Amherst, NY (US); Minish Mahendra Shah, East Amherst, NY (US); Ravi Kumar, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 12/564,500

(22) Filed: Sep. 22, 2009

(65) Prior Publication Data
US 2010/0080745 A1  Apr. 1, 2010

Related U.S. Application Data

(60) Provisional application No. 61/100,411, filed on Sep. 26, 2008, provisional application No. 61/100,399, filed on Sep. 26, 2008.

(51) Int. Cl.
*B01J 10/00* (2006.01)
*C01B 31/20* (2006.01)
*C01B 21/38* (2006.01)

(52) U.S. Cl. .......... 423/437.1; 423/235; 423/242.1; 423/393; 423/522; 423/523; 422/168; 422/169; 422/170; 422/187; 422/188; 422/189

(58) Field of Classification Search .......... 423/437.1, 423/235, 242.1, 393, 522, 523; 422/168, 422/169, 170, 187, 188, 189
See application file for complete search history.

(56) References Cited

U.S. PATENT DOCUMENTS

| 2,184,707 | A | 12/1939 | Berl |
| 2,247,625 | A | 7/1941 | Willenborg |
| 3,130,026 | A | 4/1964 | Becker |
| 3,511,027 | A | 5/1970 | Roberts et al. |
| 3,531,664 | A | 9/1970 | Hals |
| 3,649,188 | A | 3/1972 | Keilin et al. |
| 4,148,868 | A | 4/1979 | Fattinger |
| 4,152,129 | A | 5/1979 | Trentham et al. |
| 4,171,206 | A | 10/1979 | Sircar |
| 4,299,596 | A | 11/1981 | Benkmann |
| 4,417,449 | A | 11/1983 | Hegarty et al. |
| 4,441,900 | A | 4/1984 | Swallow |
| 4,595,404 | A | 6/1986 | Ozero et al. |
| 4,711,645 | A | 12/1987 | Kumar |
| 4,753,666 | A | 6/1988 | Pastor et al. |
| 4,762,543 | A | 8/1988 | Pantermuehl et al. |
| 4,770,676 | A | 9/1988 | Sircar et al. |
| 4,790,858 | A | 12/1988 | Sircar |

(Continued)

FOREIGN PATENT DOCUMENTS

CN  1347747  5/2002

(Continued)

OTHER PUBLICATIONS

Chou et al., "CO2 Recovery by Vacuum Swing Adsorption", Separation and Purification Technology (2004), pp. 51-56.

(Continued)

*Primary Examiner* — Timothy C Vanoy
(74) *Attorney, Agent, or Firm* — Donald T. Black

(57) ABSTRACT

Carbon dioxide is purified by processes employing NOx-rich sulfuric acid that can be formed by removal of $SO_2$ from the carbon dioxide.

17 Claims, 20 Drawing Sheets

U.S. PATENT DOCUMENTS

| | | | |
|---|---|---|---|
| 4,813,980 | A | 3/1989 | Sircar |
| 4,840,647 | A | 6/1989 | Hay |
| 4,846,851 | A | 7/1989 | Guro et al. |
| 4,857,083 | A | 8/1989 | DiMartino |
| 4,869,894 | A | 9/1989 | Wang et al. |
| 4,913,709 | A | 4/1990 | Kumar |
| 4,914,218 | A | 4/1990 | Kumar et al. |
| 4,952,223 | A | 8/1990 | Kirshnamurthy et al. |
| 4,963,339 | A | 10/1990 | Krishnamurthy et al. |
| 5,000,925 | A | 3/1991 | Krishnamurthy et al. |
| 5,017,204 | A | 5/1991 | Gottier et al. |
| 5,026,406 | A | 6/1991 | Kumar |
| 5,051,115 | A | 9/1991 | Leitgeb et al. |
| 5,248,322 | A | 9/1993 | Kumar |
| 5,294,247 | A | 3/1994 | Scharpf et al. |
| 5,321,946 | A | 6/1994 | Abdelmalek |
| 5,354,346 | A | 10/1994 | Kumar |
| 5,590,519 | A | 1/1997 | Almlof et al. |
| 5,648,053 | A * | 7/1997 | Mimura et al. ............... 423/210 |
| 5,792,239 | A | 8/1998 | Reinhold, III et al. |
| 5,974,829 | A | 11/1999 | Novak et al. |
| 6,070,431 | A | 6/2000 | Howard |
| 6,090,312 | A | 7/2000 | Ziaka et al. |
| 6,224,843 | B1 | 5/2001 | Ahmed et al. |
| 6,245,127 | B1 | 6/2001 | Kane et al. |
| 6,301,927 | B1 | 10/2001 | Reddy |
| 6,340,382 | B1 | 1/2002 | Baksh et al. |
| 6,477,859 | B2 | 11/2002 | Wong et al. |
| 6,497,852 | B2 | 12/2002 | Chakravarti et al. |
| 6,500,241 | B2 | 12/2002 | Reddy |
| 6,551,380 | B1 | 4/2003 | Reddy et al. |
| 6,898,936 | B1 | 5/2005 | Ochs et al. |
| 7,124,605 | B2 | 10/2006 | Parro et al. |
| 7,416,716 | B2 | 8/2008 | Allam et al. |
| 2007/0227352 | A1 | 10/2007 | Kumar |
| 2007/0227353 | A1 | 10/2007 | Kumar |
| 2007/0231244 | A1 | 10/2007 | Shah et al. |
| 2007/0232706 | A1 | 10/2007 | Shah et al. |
| 2007/0261551 | A1 | 11/2007 | Sawada et al. |

FOREIGN PATENT DOCUMENTS

| | | |
|---|---|---|
| DE | 2654582 A1 | 6/1979 |
| DE | 3639779 A1 | 6/1988 |
| EP | 0 620 035 A1 | 10/1994 |
| EP | 1 050 509 A1 | 11/2000 |
| EP | 1790614 A1 | 5/2007 |
| FR | 2 872 890 | 1/2006 |
| GB | 498223 | 1/1939 |
| GB | 2 155 805 A | 10/1985 |
| JP | 56-077673 | 6/1981 |
| WO | WO 99/35455 | 7/1999 |
| WO | WO 01/87464 A1 | 11/2001 |
| WO | WO 2006/054008 | 5/2006 |

OTHER PUBLICATIONS

Ko et al., "Optimization of Pressure Swing Adsorption and Fractionated Vacuum Pressure Swing Adsorption Processes for CO2 Capture", I&EC Res. (2005), pp. 8084-8094.

Reynolds et al., "New Pressure Swing Adsorption Cycles for CO2 Sequestration", Adsorption (2005), pp. 531-536.

Takamura et al., "Evaluation of Dual-Bed Pressure Swing Adsorption for CO2 Recovery from Boiler Exhaust Gas", Separation & Purification Tech. (2001), pp. 519-528.

White, V., "Purification of Oxyfuel Derived CO2 for Sequestration or EOR", presented at $2^{nd}$ Workshop, International Oxy-Combustion Research Network, Windsor, CT, Jan. 25-26, 2007.

Xiao et al., "Recovery of CO2 from Flue Gas Streams by Vacuum Swing Adsorption", AIChE Mtg. (2005).

Zhang et al., "Experimental Pilot-Scale Study of CO2 Recovery from Flue Gas Streams by Vacuum Swing Adsorption", AIChE Mtg. (2005).

Keilin, B., et al., "Development of the Catalytic Chamber Process for the Manufacture of Sulfuric and Nitric Acids from Waste Flue Gases," Tyco Labs Incorporated, prepared for the US EPA contract No. PH86-68-75, Oct. 1967 to Sep. 1969.

Gruber A., et al, "Development of the Catalytic Chamber Process," Tyco Labs Incorporated, prepared for the US EPA contract No. CPA 70-59, Apr. 1970 to Oct. 1970.

Booth, "Industrial Gases", 1973, pp. 104-106, Pergamon Press.

\* cited by examiner $CO_2$ VPSA - 6 Beds, 3 Pressure Equalizations and Flow through the Evacuating bed Figure 12
Valve Sequence
CO₂ VPSA - 6 Beds, 3 Pressure Equalizations and Flow through the Evacuating bed CO₂ VPSA - 6 Beds, 3 Pressure Equalizations and Direct Mixing Figure 17
Valve Sequence
CO2 VPSA - 6 Beds, 3 Pressure Equalizations and Direct Mixing

Figure 19

CO₂ VPSA - 8 Beds, 2 Pressure Equalizations and Direct Mixing
2 Beds on Feed, 3 beds on Evacuation

| | | | | | | | | | | | | | | | | | | | |
|---|---|---|---|---|---|---|---|---|---|---|---|---|---|---|---|---|---|---|---|
| A1 | FEED | | | DP1 | DP2 | DPf | | | | Evacuation | | | | | PE2 | PE1 | RP |
| A2 | RP | | FEED | | | | DP1 | DP2 | DPf | | | Evacuation | | | | | PE2 |
| A3 | PE2 | PE1 | RP | | FEED | | | | DP1 | DP2 | DPf | | | Evacuation | | | Evac |
| A4 | Evac. | | PE2 | PE1 | RP | | FEED | | | | DP1 | DP2 | DPf | | | | DPf | DP1 | DP2 |
| A5 | Evacuation | | | | PE2 | PE1 | RP | | FEED | | | | DP1 | DP2 | DPf | | | | FEED |
| A6 | | DPf | | | | | PE2 | PE1 | RP | | FEED | | | | DP1 | DP2 | DPf | | Evacuation |
| A7 | DP1 | DP2 | DPf | | | | | | PE2 | PE1 | RP | | FEED | | | | DP1 | DP2 |
| A8 | FEED | | | DP1 | DP2 | DPf | | | Evacuation | | | | PE2 | PE1 | RP | | FEED | |

Feed to CO₂ VPSA ----> CO₂ depleted stream
CoC DP1 to PE1 with a bed
CoC DP2 to PE2 with another bed
Final Depressurisation to provide part of the product to be mixed with the evacuated product
CcC Evac to collect CO₂ product
CCC PE2 with a Bed on DP2 to increase CO₂ recovery
CCC PE1 with another bed on DP1 to increase CO₂ recovery
CoC Repressurization by Feed or CcC RP by Feed Effluent

| Feed |
|---|
| DP1 |
| DP2 |
| DPf |
| Evac. |
| PE2 |
| PE1 |
| FRP |

Figure 20

CO₂ VPSA - 11 Beds, 2 Pressure Equalizations and Direct Mixing
3 Beds on Feed, 2 Beds on Evacuation

MULTI-STAGE PROCESS FOR PURIFYING CARBON DIOXIDE AND PRODUCING ACID

CROSS-REFERENCE TO RELATED APPLICATION

The present invention claims priority to U.S. provisional patent application Ser. No. 61/100,411, filed Sep. 26, 2008 and Ser. No. 61/100,399, filed Sep. 26, 2008, the entire contents of which are incorporated herein by reference in its entirety.

FIELD OF THE INVENTION

The present invention relates to the treatment of gaseous streams such as flue gas containing carbon dioxide, to remove impurities from the gas and to produce valuable byproducts.

BACKGROUND OF THE INVENTION

It is often desirable to treat carbon dioxide streams, whether naturally occurring or produced by man-made processes, to remove other components and thereby purify the carbon dioxide. For instance, combustion processes, such as coal-fired boilers, produce flue gases that contain carbon dioxide which it may be desirable to capture and sequester, for instance in saline aquifers or in oil or gas wells where the carbon dioxide is used for enhancing the production of oil or gas from the well. However, flue gas often contains impurities such as $SO_2$ and NOx which must be removed down to very low levels before the carbon dioxide can be used for enhanced oil recovery or sequestered. The present invention is a process for achieving such removal, in a way that also produces sulfuric acid and nitric acid of strengths, and in amounts, that are commercially valuable.

BRIEF SUMMARY OF THE INVENTION

One aspect of the present invention is a process for treating gaseous carbon dioxide, comprising
(A) providing a gaseous feed stream of carbon dioxide that also comprises NOx and sulfur dioxide, and that is at a pressure of at least 2 bar;
(B) contacting NOx-rich sulfuric acid (preferably formed in one or more of steps (E) and (F)) with said gaseous feed stream and $NO_2$ desorbed in step (C) to strip NOx from said NOx-rich sulfuric acid and form NOx-reduced sulfuric acid and NOx-augmented gaseous carbon dioxide that comprises $SO_2$ and $NO_2$;
(C) converting NO in said NOx-reduced sulfuric acid to $NO_2$, and desorbing said $NO_2$ from said NOx-reduced sulfuric acid to form NOx-lean sulfuric acid and desorbed $NO_2$;
(D) controlling the amount of desorbed $NO_2$ contacted with NOx-rich sulfuric acid in step (C) by converting desorbed $NO_2$ to nitric acid and NO, and recovering said nitric acid;
(E) reacting water and oxygen with the NOx-augmented gaseous carbon dioxide to form NOx-rich sulfuric acid and $SO_2$-depleted NOx-containing carbon dioxide;
(F) absorbing NOx from said $SO_2$-depleted NOx-containing carbon dioxide into one or both of NOx-reduced sulfuric acid and NOx-lean sulfuric acid (preferably formed in step (B) and/or step (C) respectively) to form NOx-rich sulfuric acid and NOx-lean $SO_2$-depleted carbon dioxide;
(G) subjecting the NOx-lean $SO_2$-depleted carbon dioxide to a subambient-temperature recovery process, employing refrigeration provided by expansion of at least one liquid carbon dioxide product stream formed by said recovery process, and preferably employing only refrigeration provided by such expansion, to produce at least one gaseous carbon dioxide product stream and at least one gaseous carbon dioxide-containing vent stream;
(J) separating the vent stream into a carbon dioxide-rich stream and a carbon dioxide-depleted stream, by pressure swing adsorption or by physical or chemical absorption; and
(K) recycling said carbon dioxide-rich stream to said carbon dioxide-containing feed stream.

Another aspect of the present invention is a process for treating gaseous carbon dioxide, comprising
(A) providing a gaseous feed stream of carbon dioxide that also comprises NOx and sulfur dioxide, and that is at a pressure of at least 2 bar;
(B) converting NO in NOx-rich sulfuric acid formed in one or both of steps (D) and (E) to $NO_2$, and desorbing $NO_2$ from said NOx-rich sulfuric acid to form NOx-lean sulfuric acid and desorbed $NO_2$;
(C) controlling the amount of desorbed $NO_2$ contacted with NOx-rich sulfuric acid in step (B) by converting desorbed $NO_2$ to nitric acid and NO, and recovering said nitric acid;
(D) reacting water and oxygen with carbon dioxide in said feed stream and desorbed $NO_2$ to form NOx-rich sulfuric acid and $SO_2$-depleted NOx-containing carbon dioxide; and
(E) absorbing NOx from said $SO_2$-depleted NOx-containing carbon dioxide into NOx-lean sulfuric acid (preferably formed in step (B)) to form NOx-rich sulfuric acid and NOx-lean $SO_2$-depleted carbon dioxide;
(F) subjecting the NOx-lean $SO_2$-depleted carbon dioxide to a subambient-temperature recovery process, employing refrigeration provided by expansion of at least one liquid carbon dioxide product stream formed by said recovery process, and preferably employing only refrigeration provided by such expansion, to produce at least one gaseous carbon dioxide product stream and at least one gaseous carbon dioxide-containing vent stream;
(G) separating the vent stream into a carbon dioxide-rich stream and a carbon dioxide-depleted stream, by pressure swing adsorption or by physical or chemical absorption; and
(H) recycling said carbon dioxide-rich stream to said carbon dioxide-containing feed stream.

Yet another aspect of the present invention is a process for treating gaseous carbon dioxide, comprising
(A) providing a gaseous feed stream of carbon dioxide that also comprises NOx and sulfur dioxide, and that is at a pressure of at least 2 bar;
(B) contacting NOx-rich sulfuric acid with said gaseous feed stream to strip NOx from said NOx-rich sulfuric acid and form NOx-reduced sulfuric acid and NOx-augmented gaseous carbon dioxide that comprises $SO_2$ and $NO_2$;
(C) reacting water and oxygen with the NOx-augmented gaseous carbon dioxide to form NOx-rich sulfuric acid and $SO_2$-depleted NOx-containing gaseous carbon dioxide;
(D) absorbing NOx from said $SO_2$-depleted NOx-containing gaseous carbon dioxide into one or both of NOx-reduced sulfuric acid and NOx-lean sulfuric acid to form NOx-rich sulfuric acid and NOx-lean $SO_2$-depleted gaseous carbon dioxide;

(E) subjecting the NOx-lean $SO_2$-depleted carbon dioxide to a subambient-temperature recovery process, employing refrigeration provided by expansion of at least one liquid carbon dioxide product stream formed by said recovery process, to produce at least one gaseous carbon dioxide product stream and at least one gaseous carbon dioxide-containing vent stream;

(F) separating the vent stream into a carbon dioxide-rich stream and a carbon dioxide-depleted stream, by pressure swing adsorption or by physical or chemical absorption; and (G) recycling said carbon dioxide-rich stream to said carbon dioxide-containing feed stream.

Other aspects of the invention comprise apparatus useful for treating gaseous carbon dioxide, such as:

(I) Apparatus Comprising (A) a stripping unit in which NOx-rich sulfuric acid can be contacted with a gaseous feed stream of carbon dioxide that also comprises NOx and sulfur dioxide, and that is at a pressure of at least 2 bar and with $NO_2$ to strip NOx from said NOx-rich sulfuric acid and form NOx-reduced sulfuric acid and NOx-augmented gaseous carbon dioxide that comprises $SO_2$ and $NO_2$;

(B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$;

(C) a nitric acid formation unit coupled to said converting unit to receive desorbed $NO_2$ therefrom and to convert said received desorbed $NO_2$ to nitric acid and NO;

(D) a reactor coupled to said stripping unit to receive said NOx-augmented gaseous carbon dioxide therefrom and react it with water and oxygen to form NOx-rich sulfuric acid and $SO_2$-depleted NOx-containing gaseous carbon dioxide;

(E) an absorber coupled to said reactor to receive $SO_2$-depleted NOx-containing gaseous carbon dioxide therefrom and absorb NOx from said $SO_2$-depleted NOx-containing carbon dioxide into one or both of said NOx-reduced sulfuric acid and said NOx-lean sulfuric acid to form NOx-rich sulfuric acid and NOx-lean $SO_2$-depleted gaseous carbon dioxide;

(F) a subambient-temperature recovery unit coupled to said absorber to receive said NOx-lean $SO_2$-depleted carbon dioxide therefrom to produce at least one gaseous carbon dioxide product stream and at least one gaseous carbon dioxide-containing vent stream employing refrigeration provided by expansion of at least one liquid carbon dioxide product stream formed by said recovery unit;

(G) a vent stream separation unit coupled to said subambient-temperature recovery unit to receive said vent stream therefrom and separate said vent stream into a carbon dioxide-rich stream and a carbon dioxide-depleted stream, by pressure swing adsorption or by physical or chemical absorption; and wherein said vent stream separation unit is coupled to said carbon dioxide-containing feed stream to feed said carbon dioxide-rich stream to said carbon dioxide-containing feed stream.

(II) Apparatus Comprising (A) a stripping unit in which NOx-rich sulfuric acid can be contacted with a gaseous feed stream of carbon dioxide that also comprises NOx and sulfur dioxide, and that is at a pressure of at least 2 bar and with $NO_2$ desorbed in the converting unit (B) to strip NOx from said NOx-rich sulfuric acid and form NOx-reduced sulfuric acid and NOx-augmented gaseous carbon dioxide that comprises $SO_2$ and $NO_2$;

(B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$, and which is coupled to said stripping unit to feed desorbed $NO_2$ to said stripping unit;

(C) a nitric acid formation unit coupled to said converting unit to receive desorbed $NO_2$ therefrom and to convert said received desorbed $NO_2$ to nitric acid and NO;

(D) a reactor coupled to said stripping unit to receive said NOx-augmented gaseous carbon dioxide therefrom and react it with water and oxygen to form NOx-rich sulfuric acid and $SO_2$-depleted NOx-containing gaseous carbon dioxide; and (E) an absorber coupled to said reactor to receive $SO_2$-depleted NOx-containing gaseous carbon dioxide therefrom and absorb NOx from said $SO_2$-depleted NOx-containing carbon dioxide into one or both of said NOx-reduced sulfuric acid and said NOx-lean sulfuric acid to form NOx-rich sulfuric acid and NOx-lean $SO_2$-depleted gaseous carbon dioxide;

(F) a subambient-temperature recovery unit coupled to said absorber to receive said NOx-lean $SO_2$-depleted carbon dioxide therefrom to produce at least one gaseous carbon dioxide product stream and at least one gaseous carbon dioxide-containing vent stream employing refrigeration provided by expansion of at least one liquid carbon dioxide product stream formed by said recovery unit;

(G) a vent stream separation unit coupled to said subambient-temperature recovery unit to receive said vent stream therefrom and separate said vent stream into a carbon dioxide-rich stream and a carbon dioxide-depleted stream, by pressure swing adsorption or by physical or chemical absorption; and wherein said vent stream separation unit is coupled to said carbon dioxide-containing feed stream to feed said carbon dioxide-rich stream to said carbon dioxide-containing feed stream.

(III) Apparatus Comprising (A) a converting unit to receive NOx-rich sulfuric acid therefrom which can catalytically convert NO in said NOx-rich sulfuric acid to $NO_2$ and desorb said $NO_2$ from said NOx-rich sulfuric acid to form NOx-lean sulfuric acid and desorbed $NO_2$;

(B) a nitric acid formation unit coupled to said converting unit to receive desorbed $NO_2$ therefrom and to convert said received desorbed $NO_2$ to nitric acid and NO;

(C) a reactor to receive $NO_2$ desorbed in unit (A) and gaseous carbon dioxide that contains NOx and sulfur dioxide, and to react NOx and sulfur dioxide in said carbon dioxide with water and oxygen and said desorbed NOx to form NOx-rich sulfuric acid and $SO_2$-depleted NOx-containing gaseous carbon dioxide; and (D) an absorber coupled to said reactor to receive $SO_2$-depleted NOx-containing gaseous carbon dioxide therefrom and absorb NOx from said $SO_2$-depleted NOx-containing carbon dioxide into one said NOx-lean sulfuric acid to form NOx-rich sulfuric acid and NOx-lean $SO_2$-depleted gaseous carbon dioxide;

(E) a subambient-temperature recovery unit coupled to said absorber to receive said NOx-lean $SO_2$-depleted carbon dioxide therefrom to produce at least one gaseous carbon dioxide product stream and at least one gaseous carbon dioxide-containing vent stream employing refrigeration provided by expansion of at least one liquid carbon dioxide product stream formed by said recovery unit;

(F) a vent stream separation unit coupled to said subambient-temperature recovery unit to receive said vent stream therefrom and separate said vent stream into a carbon dioxide-rich stream and a carbon dioxide-depleted stream, by pressure swing adsorption or by physical or chemical absorption; and wherein said vent stream separation unit is coupled to said carbon dioxide-containing feed stream to feed said carbon dioxide-rich stream to said carbon dioxide-containing feed stream.

Other aspects of the present invention include the embodiments described herein below.

As used herein, "NOx" means a mixture of gaseous oxides of nitrogen that contains at least both NO and $NO_2$.

As used herein, "oxy-fuel combustion" means feeding fuel and feeding an oxidant stream having an oxygen content of at least 80 vol. % to a combustion process and combusting the fuel with oxygen, possibly with recycle to the combustion process of at least a portion of the gaseous products of the combustion. An oxyfuel combustion process generates a flue gas stream rich in carbon dioxide.

As used herein, "pressure swing adsorption" means adsorbing a product, in this case carbon dioxide, from a gaseous feed stream onto a solid adsorbent at a first pressure, removing the feed stream depleted of the adsorbed product, and then desorbing the product at a second pressure different from the first pressure.

As used herein, "vacuum pressure swing adsorption (VPSA)" means a pressure swing adsorption process in which the second pressure is subambient pressure.

As used herein, "physical absorption" means absorbing a product, in this case carbon dioxide, from a gaseous feed stream by passing the feed stream into a liquid which preferentially dissolves the carbon dioxide from the feed stream, removing the feed stream depleted of the absorbed product, and then recovering the carbon dioxide from the liquid such as by lowering the pressure over the liquid or by stripping the carbon dioxide out of the liquid, wherein the absorption of the carbon dioxide into the liquid does not involve a chemical reaction of the carbon dioxide.

As used herein, "chemical absorption" means absorbing a product, in this case carbon dioxide, from a gaseous feed stream by passing the feed stream into a liquid which contains a component with which the carbon dioxide preferentially reacts, removing the feed stream depleted of the absorbed product, and then recovering the carbon dioxide from the liquid such as by lowering the pressure over the liquid or by stripping the carbon dioxide out of the liquid, wherein the absorption of the carbon dioxide into the liquid involves a chemical reaction of the carbon dioxide with a component in the liquid.

BRIEF DESCRIPTION OF THE DRAWINGS

FIG. 12 shows the valve sequence for operation of the carbon dioxide VPSA unit shown in FIGS. 10 and 11.

FIG. 17 shows the valve sequence for operation of the carbon dioxide VPSA unit shown in FIGS. 15 and 16.

FIG. 19 illustrates yet another cycle step chart for a carbon dioxide VPSA unit having eight beds, two pressure equalization steps and direct mixing in which two beds are continuously on feed and at least two beds are continuously under evacuation, useful in the present invention.

FIG. 20 illustrates a further cycle step chart for a carbon dioxide VPSA unit having eleven beds, two pressure equalization steps and direct mixing in which three beds are continuously on feed and two beds are continuously under evacuation, useful in the present invention.

DETAILED DESCRIPTION OF THE INVENTION

The invention is useful in treatment of gaseous carbon dioxide streams which may be obtained in many ways. In particular, gaseous carbon dioxide streams with which the invention is useful include those produced by combustion, especially flue gas streams produced by combustion of hydrocarbonaceous fuels such as coal. The various aspects of the present invention are described below with particular reference to such flue gas streams, but without intending to be limited to such streams.

Figure 1:
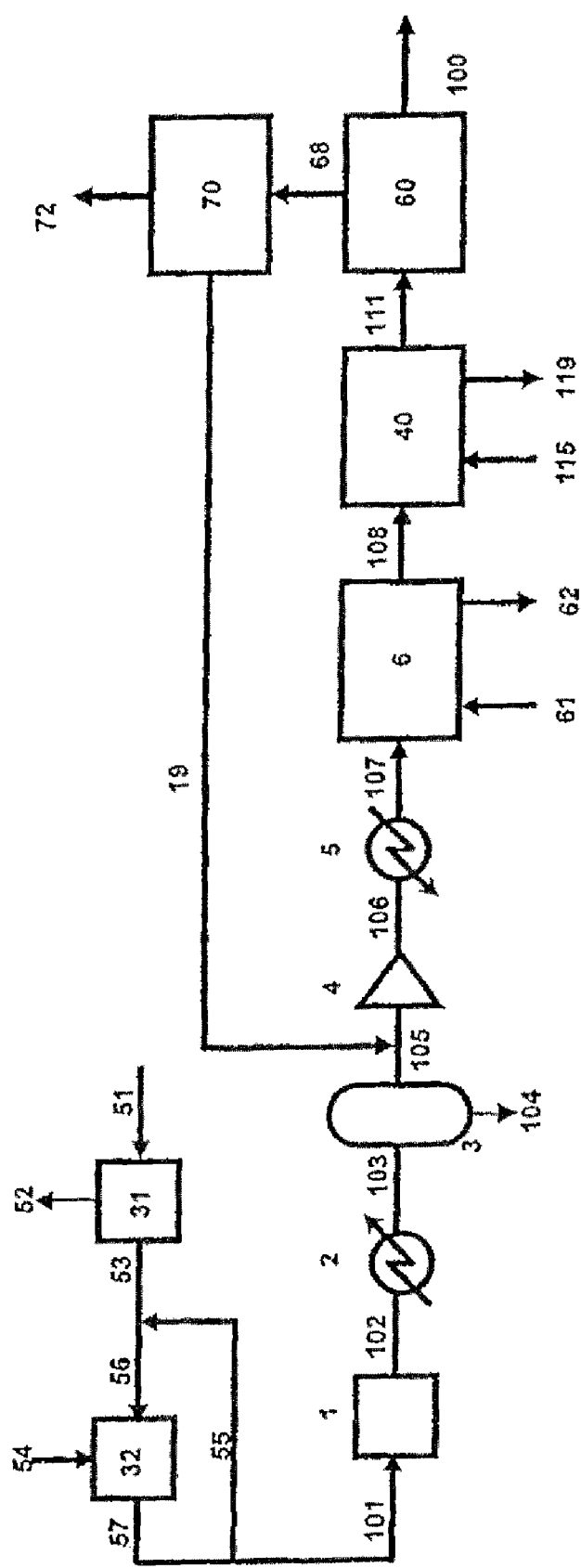
FIG. 1 is a block diagram of a process for treating flue gas, in which the present invention is useful.

FIG. 1 shows a schematic diagram of an overall flue gas treatment process which includes the aspects of the present invention. Carbon dioxide-rich flue gas is obtained from a combustion operation such as a coal-fired boiler, and preferably from an oxy-fuel combustion operation wherein coal or other fuel is combusted with gaseous oxidant having an oxygen content higher than that of air, i.e. higher that 20.9 vol. %, preferably higher than 50 vol. % and more preferably higher than 90 vol. % oxygen.

The flue gas is preferably treated, such as in an electrostatic precipitator (ESP in FIG. 1) or in a cyclone or baghouse or other particulate removal device, to remove entrained particulate matter therefrom. Then the flue gas is cooled and any condensed water is removed.

The flue gas is then compressed to a pressure of at least 2 bar, preferably at least 20 bar, and typically 20 to 40 bar. Contaminants (SOx, NOx, and Hg) and moisture are removed and a cleaned-up stream containing carbon dioxide and atmospheric gases (O2, N2 and Ar) is formed which is fed to a subambient-temperature processing stage which upgrades the purity of the carbon dioxide and produces a product stream having a desired high carbon dioxide level (95 to 99.9%). The vent stream from the subambient-temperature processing stage is fed to an adsorption or absorption stage such as a VPSA (vacuum pressure swing adsorption) unit to recover additional carbon dioxide. The recovered carbon dioxide from this stage, typically in a concentration on the order of 80 vol. %, is recycled and mixed with the feed stream of carbon dioxide-rich flue gas. The adsorption or absorption stage also produces a waste stream which is treated further or vented to the atmosphere.

FIG. 1 illustrates one of many possible applications of the present invention. In FIG. 1, air stream 51 is separated in an air separation unit 31 into an oxygen-rich stream 53 and a nitrogen-rich stream 52. The oxygen-rich stream 53 is fed to combustion unit 32 (e.g. furnace or boiler), preferably after being combined with recycled flue gas stream 55, along with fuel which is shown as stream 54. Combustion in unit 32 produces carbon dioxide-containing flue gas 57 part of which may be recycled (as is preferably the case with combustion using oxidant having a high oxygen content) and part of which as stream 101 is fed to a particulate matter control device 1. The particulate matter control device 1 can also be located before the recycle stream 55 if necessary. The flue gas stream 102 following particulate removal is fed to cooling and water removal devices 2 and 3, respectively. Stream 103 represents cooled flue gas proceeding from device 2 to device 3, though the cooling and water removal can instead be carried out in one device. Condensed water 104 is removed from the flue gas.

The flue gas stream 105 from the cooling and water removal is fed to compressor, 4, which could have multiple stages of compression, intercoolers and water knock-out drums. Preferably the flue gas 105 is compressed up to about 25 bar in a staged compression train, although the process of this invention can operate at any pressure from about 2 bar to a pressure needed for carbon dioxide sequestration. Compressed stream 106 is heated in heat exchanger 5 to preferably at least about 160° C. If desired, the flue gas can be heated before it is compressed.

Typical characteristics of the hot, compressed flue gas stream 107 are shown in the following table:

| Characteristic | | Preferred range |
|---|---|---|
| Temperature, C. | Up to 200 | 130-170 |
| Pressure, bar | 3-55 | 20-30 |
| CO₂ (vol. %) | 50-98 | 70-90 |
| Hg vapor, ppb | 0.01-1000 | 10-50 |
| NOx, ppm | 20-4000 | 300-1000 |
| SO₂ (vol. %) | 0.1-3.0 | 1.0-1.5 |

The carbon dioxide-containing feed gas may preferably be treated at some point to remove mercury. For instance, referring again to FIG. 1, the compressed flue gas 107 is contacted in mercury removal stage 6 with sulfuric acid which is fed as stream 61. Stream 61 preferably comprises concentrated sulfuric acid which is produced in the process of the present invention (recovered as stream 115 or elsewhere in the process). The concentrated sulfuric acid oxidizes mercury vapor that is in the flue gas, and reacts with the mercury vapor, forming HgSO4 as a precipitate 62 which can be easily separated and removed from the flue gas stream producing feed stream 108 which in this case is mercury-depleted. Typically, mercury removal in stage 6 employs a vessel to which a small amount of concentrated (e.g. 93 wt. %) sulfuric acid is continually or intermittently fed to maintain an amount of sulfuric acid circulating within the vessel for contact with the flue gas. The temperatures of the flue gas streams entering and leaving stage 6 are preferably maintained approximately the same so that the moisture content of the flue gas remains approximately the same.

Feed stream 108 is fed to stage 40 where NOx and SO₂ are removed from the flue gas, and sulfuric acid 115 and nitric acid 119 are formed, as described below. Stage 40 also produces NOx-lean SO₂-depleted flue gas stream 111 which is fed to subambient-temperature processing stage 60 where gases including oxygen, nitrogen and argon, and also including NOx and CO if present, are removed from the flue gas. Stage 60 produces stream 100 containing high-purity carbon dioxide, typically having a carbon dioxide content higher than 95 vol. %. Stage 60 also produces a vent gas stream 68 comprising carbon dioxide as well as other gases removed from the flue gas in stage 60. Stream 68 is fed to stage 70 where carbon dioxide is separated from the other gases by adsorption or chemical or physical absorption. Stage 70 produces waste gas stream 72 which can be further treated or vented to atmosphere, and carbon dioxide-containing product stream 19 which is recycled and combined with stream 105 (or, alternatively, with stream 106 or stream 107).

Figure 2:
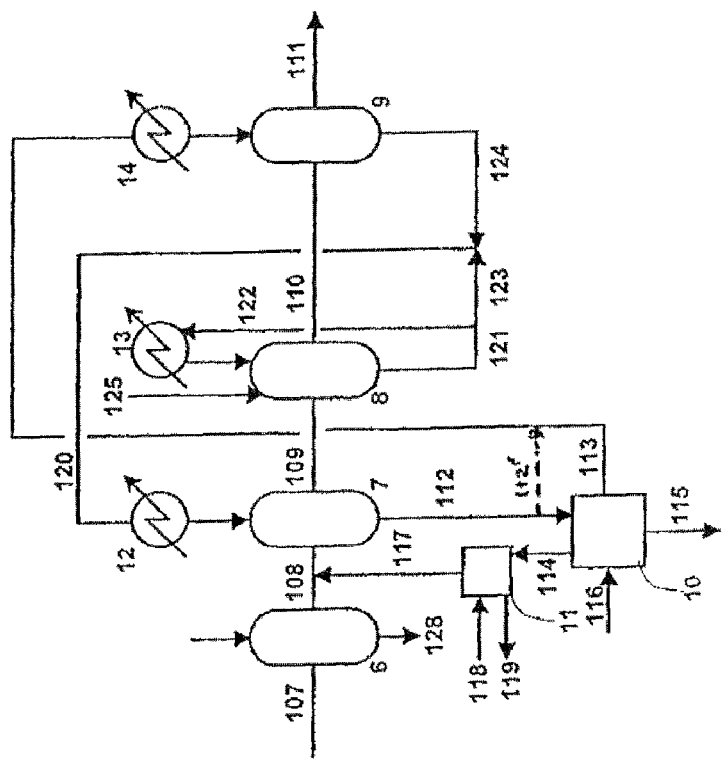
FIG. 2 is a block diagram of a preferred embodiment of a process according to the present invention.
Figure 4:
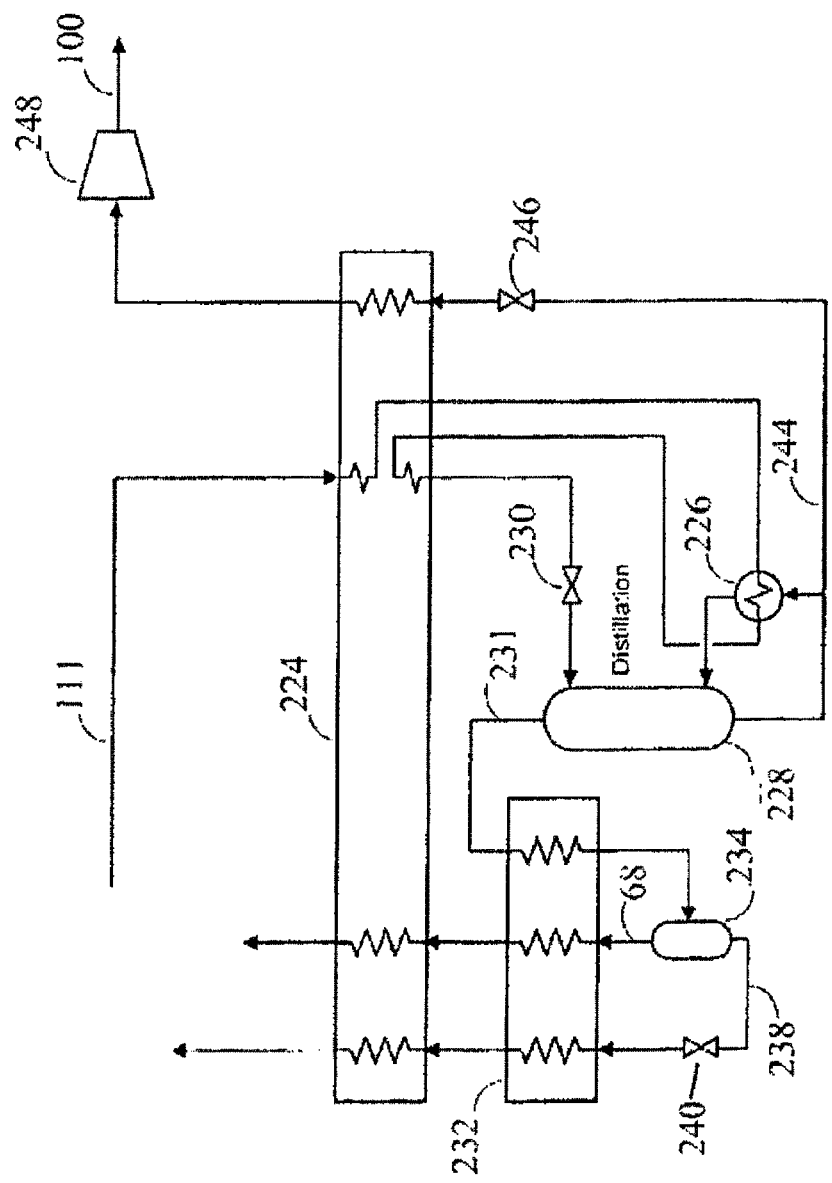
FIG. 4 is a diagram of an embodiment of a subambient-temperature processing unit useful in the method of the present invention.

Reference is now made to FIG. 2, which illustrates embodiments of process stage 40.

Gaseous NOx-containing stream 117 and carbon dioxide-containing feed stream 108 are fed to NOx stripping unit 7. Streams 108 and 117 can be combined before being fed together to unit 7, or they can be fed to unit 7 in separate lines. Alternatively stream 117 can be combined with stream 109 before stream 109 enters reactor 8 or stream 117 can be fed independently into reactor 108. The main purpose of the NOx recycle afforded by stream 117 is to elevate the concentration of NOx in the reactor 8 such that the residence time of the flue gas in reactor 8 can be minimized. The idea behind administering stream 117 to the stripping unit 7 is to possibly increase the effective time that the flue gas is in an elevated NOx environment. In unit 7 the incoming feed gas stream at a temperature on the order of 150° C. contacts NOx-rich sulfuric acid, fed as stream 120, to strip dissolved NOx from the acid. The stripped NOx joins the flue gas within unit 7 to form NOx-augmented gas stream 109 which exits unit 7. Stream 112 of NOx-reduced sulfuric acid also exits unit 7. The streams fed to unit 7 are contacted in any manner which provides effective gas-liquid contact, including the use of contact elements such as column packing elements or contact trays, or simply feeding the gas directly into the liquid within the unit.

Stream 120 contains sulfuric acid at a concentration of at least 50 wt. % and preferably at least 70 wt. %. Contacting the feed gas stream with sulfuric acid, rather than water, is preferable as enables the production of concentrated product sulfuric acid, and provides enhanced ability to purify the carbon dioxide.

The NOx-reduced sulfuric acid in stream 112 typically has a concentration of about 93 wt % sulfuric acid. More highly concentrated sulfuric acid (i.e. 98 wt. % or higher) may also be produced. The small amount of NOx which remains absorbed in this acid is removed in unit 10 by feeding stream 112 to unit 10 where NO in the NOx-reduced sulfuric acid is converted by a catalytically promoted reaction with oxygen (fed as stream 116) into $NO_2$, and the $NO_2$ is desorbed from the sulfuric acid. Effective catalytic material includes activated carbon. Desorption can be effected by reducing the pressure over the acid, and/or by heating the acid. This reaction can be carried out to the extent that the total NOx remaining in the sulfuric acid is very low, even less than 5 ppm of NOx, so the resulting $NO_2$-lean sulfuric acid has a concentration and purity that render it commercially salable. Product stream 115 of NOx-lean sulfuric acid is recovered from unit 10. Stream 113 of NOx-lean sulfuric acid is also recovered from unit 10 for further processing as described herein. However, the NOx-lean sulfuric acid 113 can be the NOx-reduced sulfuric acid 112 without passing through unit 10, as is indicated by dashed line 112' in FIG. 2. In this scenario at least some portion of stream 112 bypasses unit 10 and is fed into stream 113.

As stated above, $NO_2$ is fed to stripping unit 7. This $NO_2$ is preferably obtained from gaseous stream 114 which contains NOx and which is produced by removal of NOx from the sulfuric acid in unit 10. Some NOx is removed from the system, preferably by treatment in nitric acid formation unit 11 to convert a portion of the $NO_2$ that is in stream 114 to nitric acid by the addition of water 118. The nitric acid, recovered as stream 119, is also a valuable product of the present invention. The formation of nitric acid proceeds according to the following equation:

$$3NO_2(g)+H_2O(l)\rightarrow 2HNO_3(aq)+NO(g)$$

The NOx entering unit 11 that is not converted to nitric acid constitutes stream 117 which is treated as described above.

While as depicted in FIG. 2 all of stream 114 can be fed to nitric acid formation unit 11, with only a portion of the $NO_2$ being converted to nitric acid and the remaining $NO_2$ being fed from unit 11 as stream 117, it will be recognized as an alternative that a main stream can lead directly from unit 10 to stripping unit 7, with a side stream branching off of this main stream to feed into unit 10 in which case all of the $NO_2$ that is fed into unit 10 is converted to nitric acid.

The ability to remove nitrogen as nitric acid in stream 119 provides the ability to balance with the amount of nitrogen entering the process in feed gas stream 107. This is particularly useful when stripping unit 7 is part of an overall process for removing NOx from carbon dioxide such as flue gas. The operator can maintain control over this balance by controlling the proportion of NOx fed to unit 11 that is converted to nitric acid (for instance, by controlling how much water is fed to unit 11) or, in the alternative described above in which a main stream is fed from unit 10 to unit 11 and a side stream is fed to unit 11, by controlling how much of the main stream is diverted as the side stream.

The NOx circuit that is enabled by this control maintains a level of NOx high enough to promote formation of sulfuric acid in the next stages, while permitting formation in a reduced amount of time of nitric acid as the outlet for nitrogen entering the system.

The $NO_2$-augmented gas stream 109 that exits unit 7 is fed to reactor 8 for conversion of $SO_2$ that is in stream 109, preferably >99% of that $SO_2$, into sulfuric acid. Water 125 is also fed to reactor 8. In reactor 8, NOx and $SO_2$ autocatalytically react to oxidize $SO_2$ in the feed gas to $SO_3$, which then combines with water to form sulfuric acid. The chemistry is shown in the following Reactions 1, 2 and 3. As shown, $SO_2$ reacts with $NO_2$ forming $SO_3$ which then reacts with water to form sulfuric acid. $NO_2$ is consumed and $NO_2$ is regenerated by oxidation of NO that forms with the $SO_3$. Oxygen for this oxidation can be provided to reactor 8 as air, oxygen-enriched air, or commercially pure oxygen having an O2 content of 90 vol. % or higher. However typically no feed stream of oxidant will need to be added because the O2 level in the gas in stream 109 and in the ambient atmosphere is typically high enough to supply all of the oxidant needed for reaction 3. The cycle represented by Reactions 1, 2 and 3 continues until as much as desired, preferably as much as possible, of the $SO_2$ has been converted to sulfuric acid. Conversion of more than 99% of the $SO_2$, and even of more than 99.9% of the $SO_2$, is obtained in this manner.

$$SO_2+NO_2\rightarrow SO_3+NO \qquad \text{Reaction 1}$$

$$SO_3(g)+H_2O(l)\rightarrow H_2SO_4(l) \qquad \text{Reaction 2}$$

$$NO+0.5O_2(g)\rightarrow NO_2 \qquad \text{Reaction 3}$$

$SO_2$-depleted gas stream 110 is obtained from reactor 8. It still contains $SO_2$, typically much less than 0.1 vol. % $SO_2$. Stream 110 also contains NOx. NOx-rich sulfuric acid stream 121 also exits from reactor 8. A side stream 122 is taken from stream 121, cooled in heat exchanger 13, and returned to reactor 8 as needed in order to maintain temperature control within reactor 8. The remaining NOx-rich sulfuric acid stream 123 can be recycled, with heating as needed in heater 12, to unit 7.

Stream 110, which still contains high levels of NOx, is fed to absorber 9 as is stream 113 of NOx-lean sulfuric acid, after cooling as needed (typically to about 30° C.) in heat exchanger 14. The NOx-lean sulfuric acid used in this step has a sulfuric acid content of at least 50 wt. % and preferably at least 70 wt. %. Using sulfuric acid instead of water affords many advantages, especially in enabling the production of a highly concentrated sulfuric acid product. The NOx-lean sulfuric acid is preferably obtained from unit 10 (or unit 7). The cooled NOx-lean sulfuric acid 113 is contacted with $SO_2$-depleted gas from stream 110 in absorber 9 to absorb NOx from the gas. Contact is preferably provided in any manner which provides effective gas-liquid contact, including the use of contact elements such as column packing elements or contact trays, or simply feeding the gas directly into the liquid within the unit. Product NOx-lean $SO_2$-depleted gas stream 111 leaves absorber 9. Stream 111 contains $SO_2$, in amounts typically of 1-10 ppm or higher. The NOx content of stream 111 is typically about 50 ppm or less. This corresponds to 0.02 lb NOx/MMbtu of power generation in combustion unit 32 which is about one-seventh of the strictest emission requirements now applicable to carbon-dioxide-emitting combustion units.

NOx-rich sulfuric acid stream 124 is also recovered from absorber 9. This stream can be heated as needed and can be recycled to unit 7, for instance by combining streams 124 and 123 as shown in FIG. 2.

The production and usage of concentrated sulfuric acid in the manner of the process of the present invention has many added benefits, one of which is the drying of the carbon dioxide-containing gas prior to any further treatment thereof. This eliminates the need for any subsequent drying before the gas stream proceeds on to the subambient-temperature processing stage for separation of inert gases from the carbon dioxide. The gas leaving absorber 9 has typically been dehydrated to a dewpoint of less than −70° C. such that this stream can be directly fed to the subambient-temperature processing stage.

The pressure in all stages should be at least 2 bar, and preferably in the range of 20 to 40 bar.

Characteristics of the process streams in this invention are set forth in the following tables:

| Into unit 7: Stream 108 | | |
|---|---|---|
| | | Preferred range |
| Temperature, C. | Up to 200 | 130-170 |
| Pressure, bar | 3-55 | 20-30 |
| $CO_2$ (vol. %) | 50-98 | 70-90 |
| Hg vapor, (ppb) | .001-100 | 0.001-2 |
| NOx (vol. %) | .0002-4 | 0.5-2 |
| SOx (vol. %) | 0.1-3.0 | 1.0-1.5 |

| Into unit 7: Stream 120 | | |
|---|---|---|
| | | Preferred range |
| Temperature, C. | 20-150 | 40-80 |
| Pressure, bar | 3-50 | 20-30 |
| $CO_2$ (wt. %) | 0.5-5 | 1-3 |
| NOx (wt. %) | 0.1-20 | 1-5 |
| H2SO4 (wt. %) | 70-100 | 90-98 |

| Out of unit 7/Into unit 8: Stream 109 | | |
|---|---|---|
| | | Preferred range |
| Temperature, C. | 50-150 | 60-120 |
| Pressure, bar | 3-50 | 20-30 |
| $CO_2$ (vol. %) | 50-98 | 70-90 |
| NOx (vol. %) | .0002-4 | 0.5-2 |
| SOx (vol. %) | 0.1-3.0 | 1.0-1.5 |

| Out of unit 7/Into unit 10: Stream 112 | | |
|---|---|---|
| | | Preferred range |
| Temperature, C. | 80-200 | 140-180 |
| Pressure, bar | 3-50 | 20-30 |
| $CO_2$ (wt. %) | 0.5-10 | 1-5 |
| NOx (wt. %) | 5 ppm-1% | 0.01-0.3 |
| H2SO4 (wt. %) | 70–>100 | 93-98 |

| Out of unit 8/Into unit 9: Stream 110 | | |
|---|---|---|
| | | Preferred range |
| Temperature, C. | 40-150 | 60-100 |
| Pressure, bar | 3-50 | 20-30 |
| $CO_2$ (vol. %) | 50-98 | 70-90 |
| NOx (vol. %) | 0.1-3.0 | 0.5-2 |
| SOx (vol. %) | 1 ppm-0.5 | 0.01-0.1 |

| Out of unit 8: Stream 121 | | |
|---|---|---|
| | | Preferred range |
| Temperature, C. | 40-180 | 60-150 |
| Pressure, bar | 3-50 | 20-30 |
| $CO_2$ (wt. %) | 0.5-10 | 1-5 |
| NOx (wt. %) | .0002-4 | 0.1-2 |
| H2SO4 (wt. %) | 70–>100 | 93-98 |

| Into unit 9: Stream 113 | | |
|---|---|---|
| | | Preferred range |
| Temperature, C. | 60-200 | 80-180 |
| Pressure, bar | 3-50 | 20-30 |
| $CO_2$ (wt. %) | 0.5-10 | 1-5 |
| NOx (wt. %) | 5 ppm-1% | 0.01-0.3 |
| H2SO4 (wt. %) | 70–>100 | 93-98 |

| Out of unit 9: Stream 111 | | |
|---|---|---|
| | | Preferred range |
| Temperature, C. | 20-100 | 30-50 |
| Pressure, bar | 3-50 | 20-30 |
| $CO_2$ (vol. %) | 50-98 | 70-90 |
| NOx (ppm) | 0.1-300 ppm | 1-50 ppm |
| SOx (ppm) | 10-1500 ppm | 10-300 ppm |

| Out of unit 9: Stream 124 | | |
|---|---|---|
| | | Preferred range |
| Temperature, C. | 20-100 | 40-70 |
| Pressure, bar | 3-50 | 20-30 |
| $CO_2$ (wt. %) | 0.5-15 | 1-5 |
| NOx (wt. %) | .0002-4 | 0.1-3 |
| H2SO4 (wt. %) | 70–>100 | 80-98 |

| Out of unit 10: Stream 113 | | |
|---|---|---|
| | | Preferred range |
| Temperature, C. | 60-200 | 80-180 |
| Pressure, bar | 3-50 | 20-30 |
| $CO_2$ (wt. %) | 0.5-10 | 1-5 |

-continued

Out of unit 10: Stream 113

| | | Preferred range |
|---|---|---|
| NOx (wt. %) | 5 ppm-1% | 0.01-0.3 |
| H2SO4 (wt. %) | 70->100 | 93-98 |

Out of unit 10/Into unit 11: Stream 114

| | | Preferred range |
|---|---|---|
| Temperature, C. | 60-200 | 80-180 |
| Pressure, bar | 3-50 | 20-30 |
| $CO_2$ (vol. %) | 0.5-10 | 1-5 |
| NOx (vol. %) | 0.1 ppm-1% | 1 ppm-1000 ppm |
| SOx (vol. %) | 70->100 | 93-98 |

Out of unit 10: Stream 115

| | | Preferred range |
|---|---|---|
| Temperature, C. | 60-200 | 80-180 |
| Pressure, bar | 3-50 | 20-30 |
| $CO_2$ (wt. %) | 0.5-10 | 1-5 |
| NOx (wt. %) | 0.1 ppm-1% | 1 ppm-1000 ppm |
| H2SO4 (wt. %) | 70->100 | 93-98 |

Out of unit 11: Stream 117

| | | Preferred range |
|---|---|---|
| Temperature, C. | 60-200 | 80-180 |
| Pressure, bar | 3-50 | 20-30 |
| $CO_2$ (vol. %) | 0.5-90 | 1-60 |
| NOx (vol. %) | 1-100 | 20-60 |
| SOx (vol. %) | 1 ppm-10% | 10-10000 ppm |

Out of unit 11: Stream 119

| | | Preferred range |
|---|---|---|
| Temperature, C. | 60-200 | 80-180 |
| Pressure, bar | 3-50 | 20-30 |
| $CO_2$ (wt. %) | 1 ppm-10% | 0.1-2 |
| HNO3 (wt. %) | 20-100 | 40-60 |
| SOx (wt. %) | 1 ppm-10% | 10 ppm-1000 ppm |

The various aspects of the present invention have numerous distinguishing features and provide numerous advantages.

The process preferably operates at higher temperatures than conventional practice, specifically in stripping unit 7 where NOx is stripped out of sulfuric acid. The higher temperature used in stripping unit 7 enables the production of higher sulfuric acid concentrations. Prior practice of units such as unit 7 may only be able to produce sulfuric acid at or below 76 wt %. The factor limiting this concentration is the ability of the process to strip NOx out of the acid solution. As the acid becomes more concentrated, NOx is absorbed more strongly and is thus more difficult to remove by stripping.

The process of the present invention is able to overcome this limitation and produce concentrated acid, because of at least the following two features. Higher temperatures in unit 7 allow NOx to be more easily stripped, and the high temperature catalytic NOx removal reaction in unit 10 helps to remove any residual NOx in the product acid.

The concentrated sulfuric acid, typically exhibiting a concentration higher than 93 wt % acid, which is produced with the process of the present invention has other advantages, such as:

1) Mercury in the flue gas stream can be oxidized using high temperature, >130° C., concentrated acid, >85 wt %, which can be the product sulfuric acid formed and recovered in unit 10. This occurs upstream of the rest of the process to make sure mercury does not contaminate the product acid.
2) The concentrated acid that is fed to absorber 9 (operating at low temperature, on the order of 40° C.) and the high process pressure help to reduce NOx amounts in the gas stream leaving the process to uniquely low levels, i.e. <50 ppm.
3) The concentrated acid that is fed to the absorber 9 effectively reduces the moisture content of the gas stream leaving the process to very low levels. A dew point of less than −70° C. can be expected if 93 wt % or greater sulfuric acid is used in the absorber 9 (for a process operating at ~25 bar). If the flue gas is to be further processed for inert removal as the case may be for carbon dioxide sequestration, this will eliminate the need to use any subsequent drying adsorbents before the flue gas is subjected to cooling in a subambient-temperature processing stage.

Other advantages of the present invention include that $SO_2$, NOx and Hg can be recovered separately. Also, sulfuric acid and nitric acid are produced which are of high enough quality that they may be sold for an additional revenue stream. In addition, the process of the present invention operates at elevated pressure which serves to speed the rate of the homogeneous reactions involved in the process and to reduce the size of the equipment which is needed for the flue gas processing.

The recycling NOx circuit comprised of the NOx in the acid streams and the gas streams shown in FIG. 2, is a preferred feature of this invention. It concentrates the NOx in the system which serves to significantly reduce the necessary residence time of the process. The smaller equipment sizes of the process allowed by the elevated pressure operation and short residence times, allowed by the NOx recycle circuit, serves to reduce the capital cost and footprint of this SOx and NOx removal strategy.

The process of the present invention also permits any subsequent contaminant control devices, such as a selective catalytic reduction unit, mercury adsorbent bed, or water adsorbent bed to be eliminated. This serves to greatly reduce the cost associated with the flue gas processing operation.

Operating costs associated with the process of the present invention will also be reduced over a comparable wet-limestone based desulfurization process because this process will yield separate streams of concentrated saleable sulfuric and nitric acid. If the SOx and NOx is captured as acid and sold, the costs associated with purchase, transportation and disposal of limestone will be eliminated while additional income will be realized.

Additional embodiments of the present invention in addition to those described above may also be practiced. In case the purity of the acid streams produced is not high enough (with respect to residual NOx) for sale on the acid market, additional purification steps may be employed. If further NOx removal from sulfuric acid is necessary, it is evident to one of ordinary skill in the art that there are many processes of NOx removal from sulfuric acid that may also be employed. These processes may include the use of hydrazine, H2O2, sulfamic acid, and the like.

Although the embodiments shown in the Figures show only one unit at each stage of the process, each operating at one given pressure, it is within the scope of this invention to have multiple units at any stage or at each stage operating at a single or multiple pressures. Having multiple absorbers and/or reactors may allow for better control of the $NO:NO_2$ ratio and for more complete NOx and/or SOx containment. Also, the catalytic stripping and/or recycle of NOx may be staged at different locations within a single absorber/reactor or may be staged in multiple absorber and/or reactors.

Figure 3:
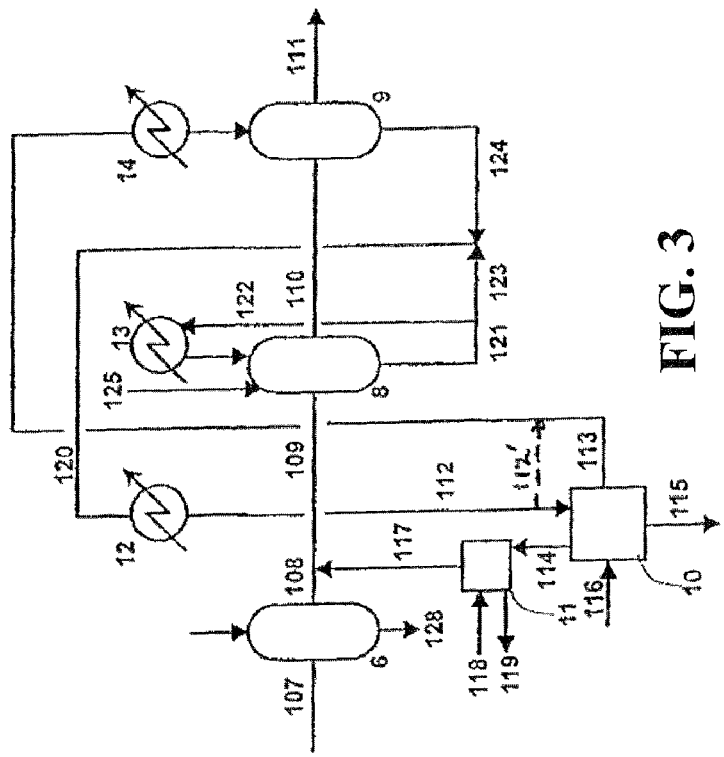
FIG. 3 is a block diagram of an alternate embodiment of the process shown in FIG. 2.

In another embodiment of this invention, shown in FIG. 3, stripping unit 7 is not employed. This embodiment is useful if the amount of NOx in stream 120 is too low to provide significant amounts of stripped NOx into the flue gas stream 108. In such a case, stream 120 (which may be referred to in this embodiment as a NOx-enriched sulfuric acid stream) is sent directly to unit 10, and stream 117 from unit 11 as well as stream 108 are fed to reactor 8 whether or not streams 117 and 108 are joined before entering reactor 8.

In another embodiment of FIG. 3, the operation of stripping unit 7 can be physically integrated with reactor 8 such that the features of both stripping unit 7 and reactor 8 are combined in a single vessel. In such a case, stream 120 is sent directly to unit 10, and stream 117 from unit 11 as well as stream 108 are fed to reactor 8 whether or not streams 117 and 108 are joined before entering reactor 8.

Direct contact intercoolers and aftercoolers may also be used in this system for cooling of the flue gas. Direct contact intercooling is advantageous due to the large volume of gas which would otherwise need to be indirectly cooled. Water or any other solution including sulfuric and/or nitric acid may be used in these direct contact heat exchange stages.

In cases in which oxy-fuel combustion produces flue gas that contains only extremely low amounts of NOx, it may be necessary to add NOx in the form of NO, $NO_2$, nitric acid, or ammonia to the process (for instance, into unit 7) to maintain efficient $SO_2$ removal from the flue gas. Addition of NOx, nitric acid or ammonia may also be necessary during process startups to quickly build up the amount of NOx absorbed in the NOx-rich sulfuric acid to a level which is appropriate for efficient $SO_2$ removal.

Subambient-Temperature Processing

The NOx-lean $SO_2$-depleted flue gas stream 111 is fed to stage 60 for separation of $O_2$, $N_2$ and argon, as well as NOx and CO if present, from the carbon dioxide. Preferably the process used in this stage employs subambient-temperature processing, such as: partial condensation followed by distillation; partial condensation followed by phase separation; first partial condensation followed by phase separation followed by further partial condensation of the gas stream from the first partial condensation followed by further phase separation.

Examples of preferred subambient-temperature processes are illustrated in FIGS. 4-9. Referring first to FIGS. 4-7, feed stream 111 from stage 60 and specifically from absorber 9 is introduced into a main heat exchanger 224 in which it is partly cooled and then introduced into a reboiler 226 that serves to produce boil up or initiate an ascending vapor phase within distillation column 228. Feed stream 111 is then again introduced into main heat exchanger 224 in which it is fully cooled to at least partially liquefy carbon dioxide in stream 111. The stream 111 is then introduced through an expansion valve 230 into column 228 to initiate a descending liquid phase within such column.

In a manner well known in this art, column 228 preferably has structured packing to contact the ascending vapor phase flowing up through the packing with a descending liquid flow of the liquid phase. Other vapor-liquid contacting elements known in the art could be used such as sieve trays. As a result of the contact, the descending liquid phase becomes evermore rich in carbon dioxide, the less volatile component and the ascending vapor phase becomes evermore rich in impurities that have a higher volatility than the carbon dioxide. Column 228 produces a carbon dioxide-lean column overhead stream 231 and a carbon dioxide-rich, liquid column bottom stream 244.

Column overhead stream 231 from column 228 is then passed through an auxiliary heat exchanger 232 so that the carbon dioxide in overhead stream 231 is at least partially liquefied. The carbon dioxide overhead stream 231 is then passed through a phase separator 234 to produce a carbon dioxide-depleted vapor stream 68 and a carbon dioxide-rich liquid stream 238. Carbon dioxide-rich liquid stream 238 is expanded through an expansion valve 240. Expansion through valve 240 provides refrigeration for the partial liquefaction of carbon dioxide overhead stream 231. Expanded stream 238 and stream 68 are passed through auxiliary heat exchanger 232 and through main heat exchanger 224.

Stream 68 is passed to stage 70 which is described herein.

Stream 238 after having passed through main heat exchanger 224 can be combined with stream 68 and fed to stage 70, or stream 238 can be recycled (not shown) to the inlet of an appropriate stage of a compressor 30.

A carbon dioxide product stream 244 as a liquid can be extracted from column 228 and is composed of carbon dioxide-rich liquid column bottoms. The carbon dioxide product stream 244 can then be expanded in an expansion valve 246 to generate refrigeration for the process and can thereafter be vaporized within main heat exchanger 224 and compressed in a product compressor 95 to produce a compressed carbon dioxide stream 100 as the carbon dioxide product. The product compressor 95 could be a multi-stage compressor with interstage cooling.

Figure 5:
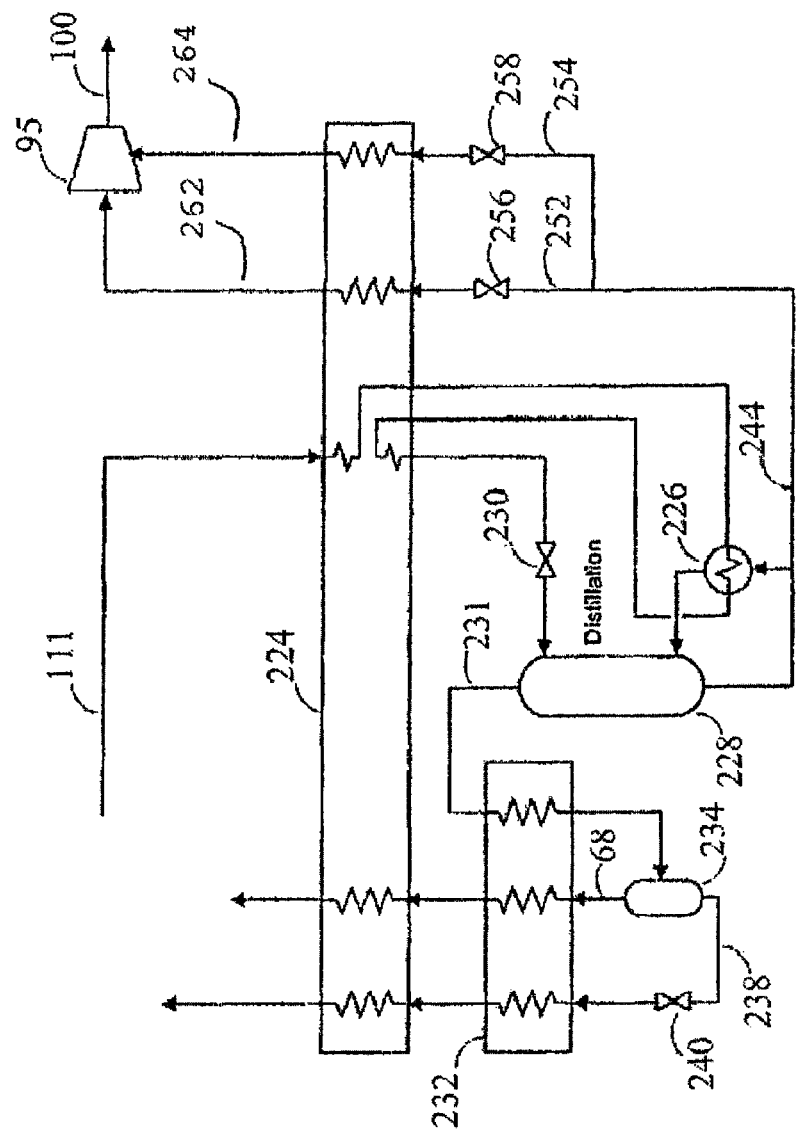
FIG. 5 is a diagram of another embodiment of a subambient-temperature processing unit useful in the method of the present invention.

In the embodiment depicted in FIG. 5, carbon dioxide product stream 244 is not expanded all at the same pressure but is split into subsidiary streams 252 and 254 and at least the subsidiary stream 252 is expanded by the use of expansion valve 256 to a pressure lower than the pressure to which stream 254 is expanded. Streams 252 and 254 are expanded to their respective expanded pressures by the use of expansion valves 256 and 258, respectively, which have different orifices for such purposes. Both subsidiary streams 252 and 254 are then vaporized in main heat exchanger 224. The resultant lower pressure subsidiary stream 262 is introduced into the inlet of product compressor 95. The higher pressure subsidiary stream 264 is introduced into an intermediate stage of product compressor 95. The compressed product stream 100 is recovered from compressor 95.

Figure 6:
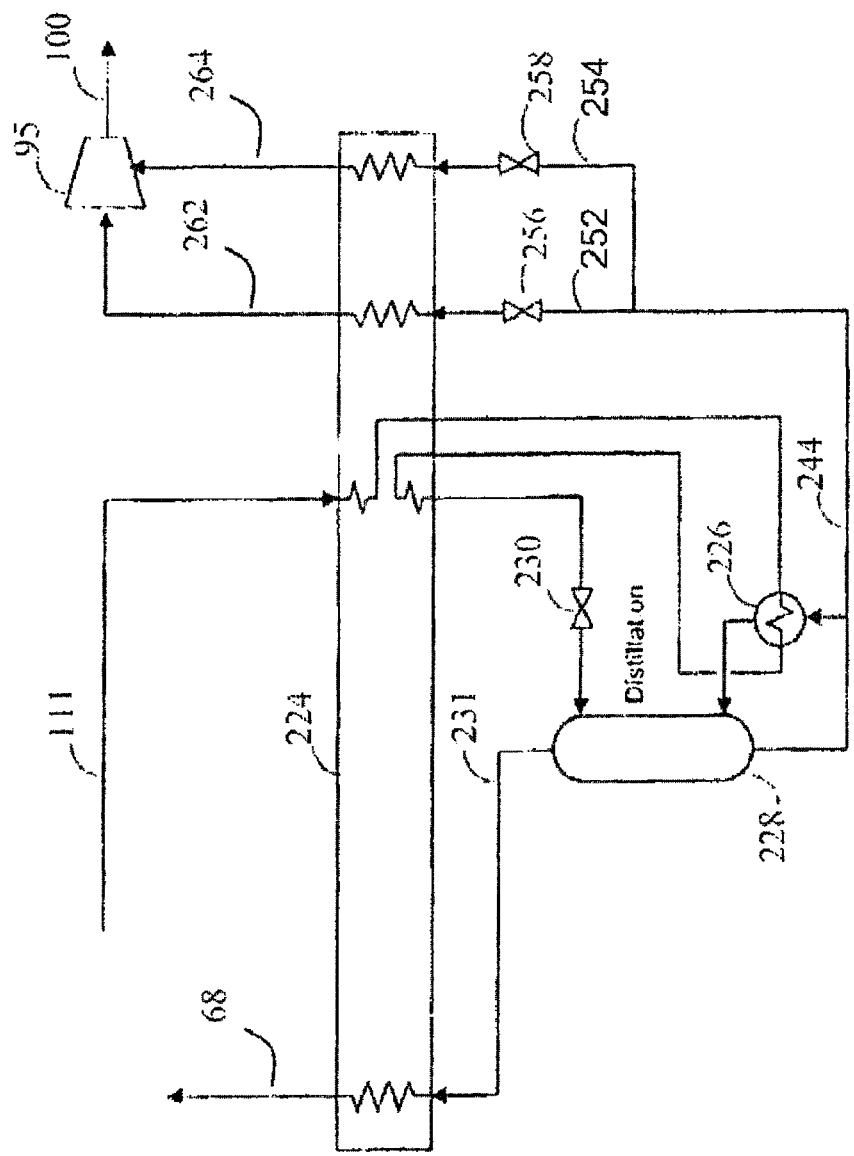
FIG. 6 is a diagram of another embodiment of a subambient-temperature processing unit useful in the method of the present invention.

In the embodiment depicted in FIG. 6, column overhead stream 231 can simply be passed into main heat exchanger 224. This recovers refrigeration from column overhead stream 231.

Figure 7:
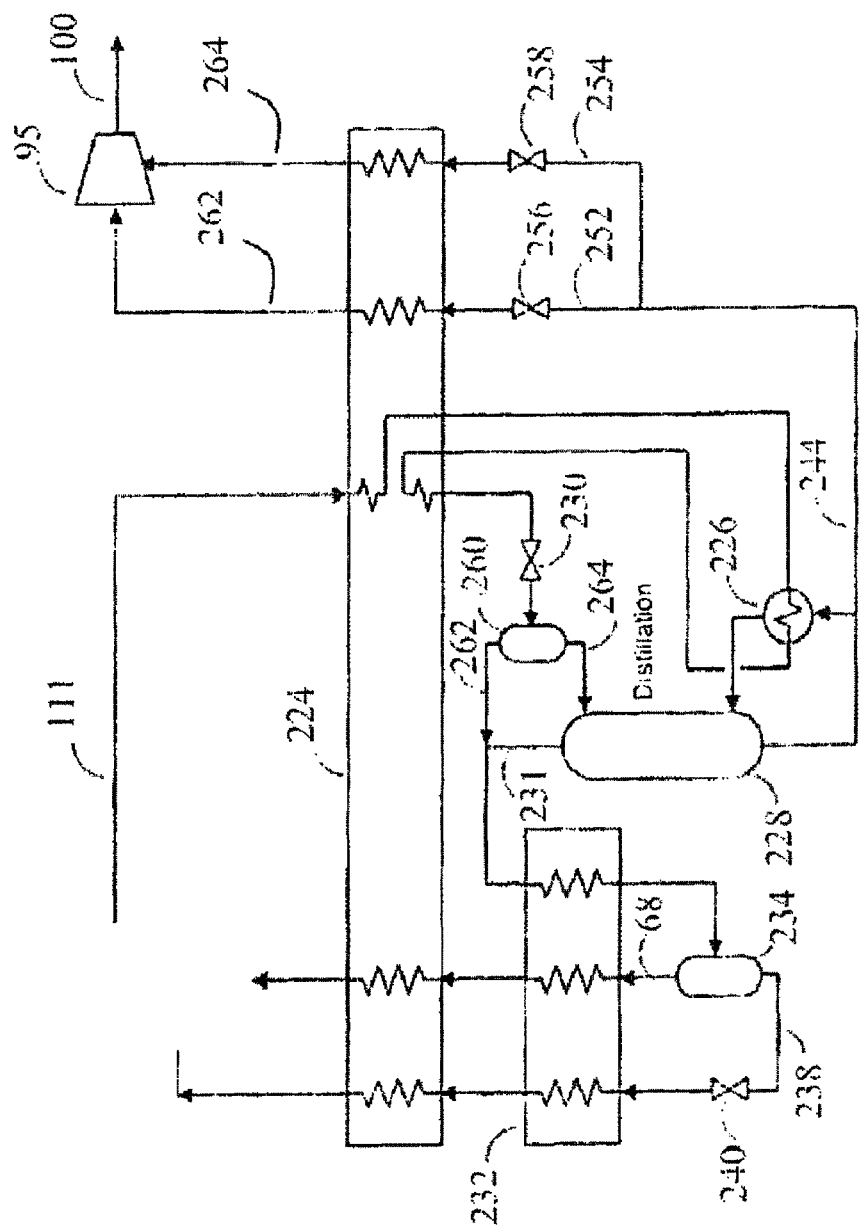
FIG. 7 is a diagram of another embodiment of a subambient-temperature processing unit useful in the method of the present invention.

In the embodiment depicted in FIG. 7, feed stream 111 after expansion through valve 230 is introduced into a phase separator 260 to produce a vapor phase stream 2262 and a liquid phase stream 2264. Liquid phase stream 2264 is introduced into column 228 to produce the carbon dioxide containing column bottoms 244 and vapor phase stream 231 which can be combined with stream 2262 and passed through auxiliary heat exchanger 232 as described in connection with the embodiment of the invention described with respect to FIG. 4. Phase separator 260 could be used in any embodiment of the present invention.

Figure 8:
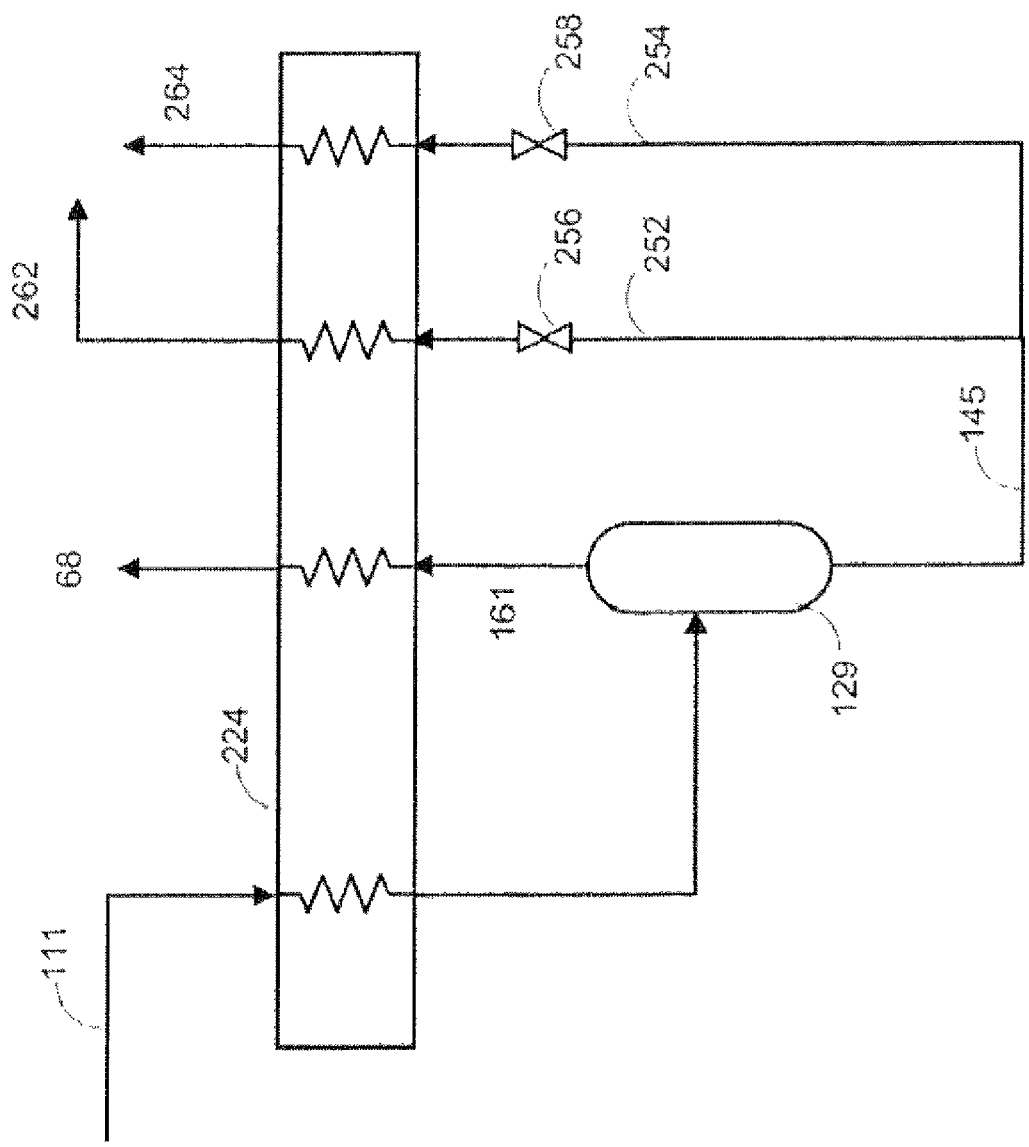
FIG. 8 is a diagram of another embodiment of a subambient-temperature process useful in the method of the present invention.

FIG. 8 shows an alternative configuration of subambient-temperature processing based on partial condensation followed by one stage of phase separation. Feed stream 111 is cooled in a heat exchanger 224 against cold streams being warmed. Feed stream 111 is cooled to 0° F. to −70° F. to partially condense it and is then fed to a phase separator 129. A carbon dioxide product stream with >90% purity (by volume), preferably >95% purity, is withdrawn as a liquid stream 145. A carbon dioxide-lean stream from the phase separator 129 is recovered as a gaseous stream 161. The liquid stream 145 is expanded through at least one expansion valve 256. It will be advantageous to split stream 145 into two separate streams 252 and 254 and expand them through two expansion valves 256 and 258 to two different pressures. The pressure to which the carbon dioxide liquid product is expanded is usually 50 to 300 psia lower than the pressure of feed 111 to the subambient-temperature processing unit. The resultant expanded carbon dioxide product streams 262 and 264 and gaseous stream 161 are warmed through heat exchanger 224. The carbon dioxide-lean stream 68 is then fed to adsorption based or absorption based separation in unit 70. The carbon dioxide product streams 262 and 264 can be compressed and recovered as described herein.

Figure 9:
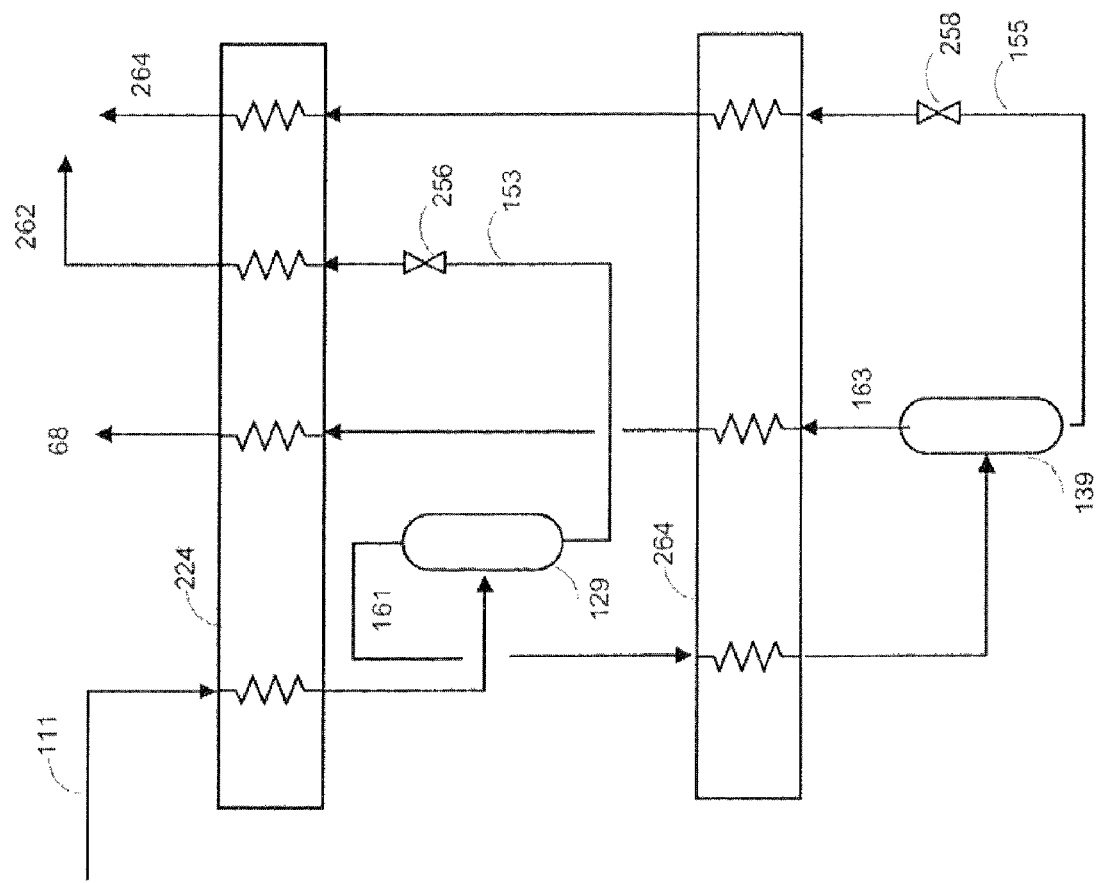
FIG. 9 is a diagram of another embodiment of a subambient-temperature process useful in the method of the present invention.

FIG. 9 shows another embodiment of subambient-temperature processing where partial condensation is followed by two stages of phase separation. The feed stream 111 is first cooled in heat exchanger 224 to 0° F. to −40° F. to cause partial condensation, and is then fed to a phase separator 129. The first carbon dioxide product is recovered as liquid stream 153 and expanded through expansion valve 256. The vapor stream 161 from phase separator 129 is further cooled in another heat exchanger 2264 to −20° F. to −70° F. to partially condense it. The partially condensed stream 161 is then fed to another phase separator 139. A second product carbon dioxide stream is recovered as liquid stream 155 which is expanded through expansion valve 258. Further carbon dioxide-depleted vapor stream 163 is recovered from the phase separator 139. The expanded second carbon dioxide product stream 155 and vapor stream 163 are warmed through heat exchangers 2264 and 224 and the expanded first carbon dioxide product stream 153 is warmed through heat exchanger 224. The carbon dioxide-lean stream 68 and the two carbon dioxide product streams 262 and 264 are further processed as described herein.

Purified carbon dioxide is obtained from the subambient-temperature processing in one stream or in two streams such as streams 262 and 264 which may be at the same pressure or at two different pressures. The purified carbon dioxide stream or streams can if desired be compressed in e.g. a multistage compressor 95 to a pressure of 500 to 3000 psia, preferably to 1500 to 2500 psia. Such compression is desirable for pipeline transport or other disposition of the stream. The purity of carbon dioxide is generally greater than 95%. Using the subambient-temperature process, 60-93 percent of carbon dioxide contained in stream 111 is recovered as product carbon dioxide in stream 100. The extent of recovery depends on the concentration of carbon dioxide in stream 111. The remaining carbon dioxide is contained in vent stream 68, which is usually at pressure close to the pressure of feed stream 111. The concentration of carbon dioxide in vent stream 68 is usually in the 25-40% range.

Processing of Stream 68

As illustrated in FIG. 1, stream 68 is then fed to unit 70 where it undergoes further separation, by adsorption, by physical absorption or by chemical absorption. Unit 70 produces a carbon dioxide-rich stream 19 at 15-20 psia and carbon dioxide depleted stream 72 at essentially the pressure of stream 68 that was fed to unit 70. The carbon dioxide-rich stream 19 is recycled and mixed with flue gas stream 105, 106, 107 or 108. By recovering additional carbon dioxide from vent stream 68 by processing in unit 70 and recycling it, the overall carbon dioxide recovery can be increased to the range of 96-99%. Thus, the product stream 100 contains 96% to 99% of the carbon dioxide contained in flue gas stream 101.

Adsorption

In this embodiment, vent stream 68 is passed on to a vacuum pressure swing adsorption (VPSA) unit 70. The VPSA unit contains multiple beds containing adsorbent that selectively adsorbs carbon dioxide. The VPSA unit produces a carbon dioxide-rich stream 19 at 15-20 psia and the carbon dioxide depleted stream 72 at essentially the pressure of stream 68 that was fed to the VPSA.

After the carbon dioxide concentration is increased by multiple depressurizations in unit 70 it can be used to produce the carbon dioxide product by further pressure reduction. For some adsorbents, depressurization from high to low pressure increases carbon dioxide concentration in the adsorbent bed. This step in the process can be used to eliminate several process steps as described in the prior art. Consequently, several pieces of rotating machinery (e.g., rinse compressor, purge compressor, recycle compressor) and associated power requirements can be eliminated, thus providing a process and system that enhances operation and improves efficiency.

Figure 12:
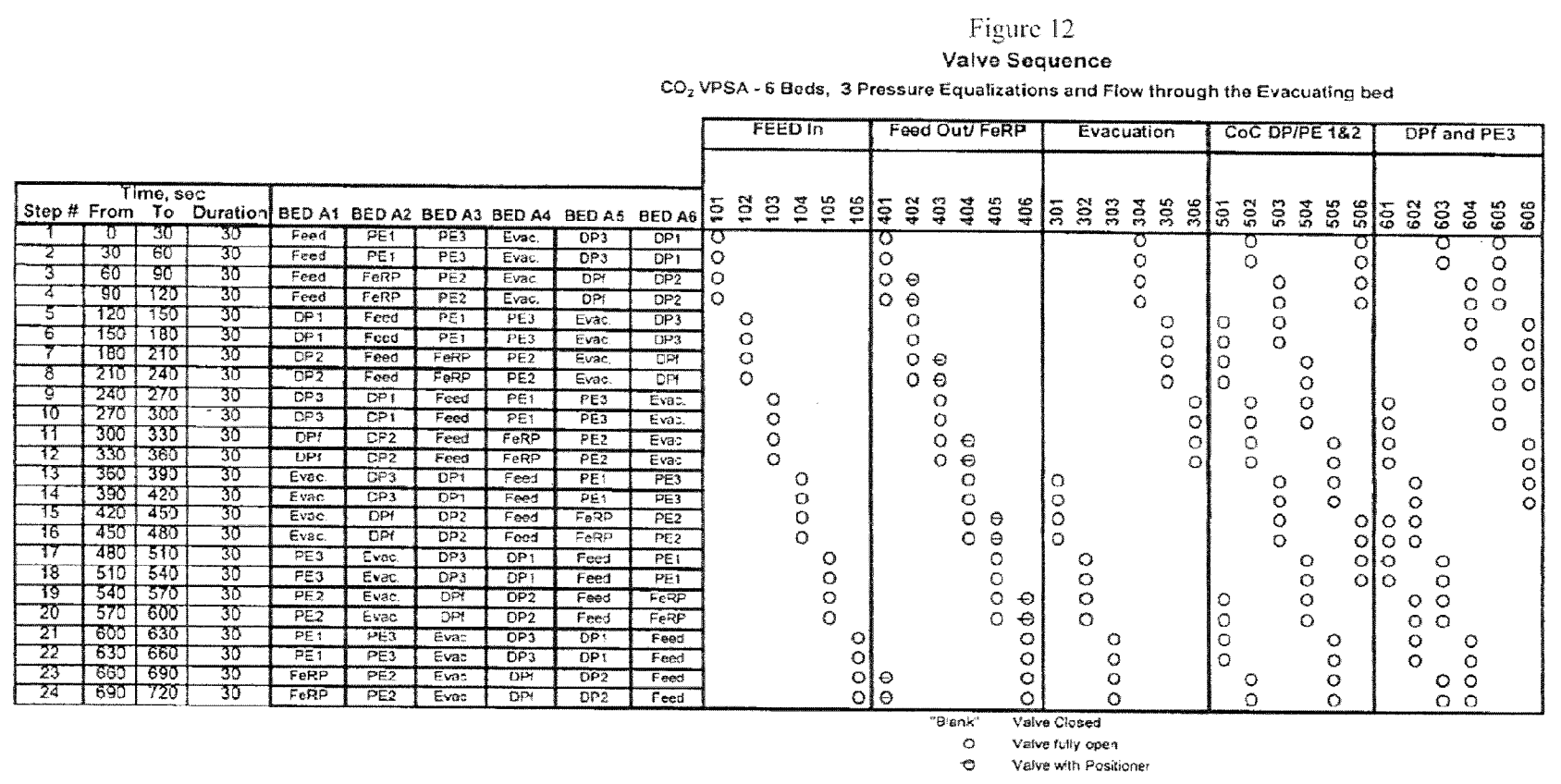
Figure 13:
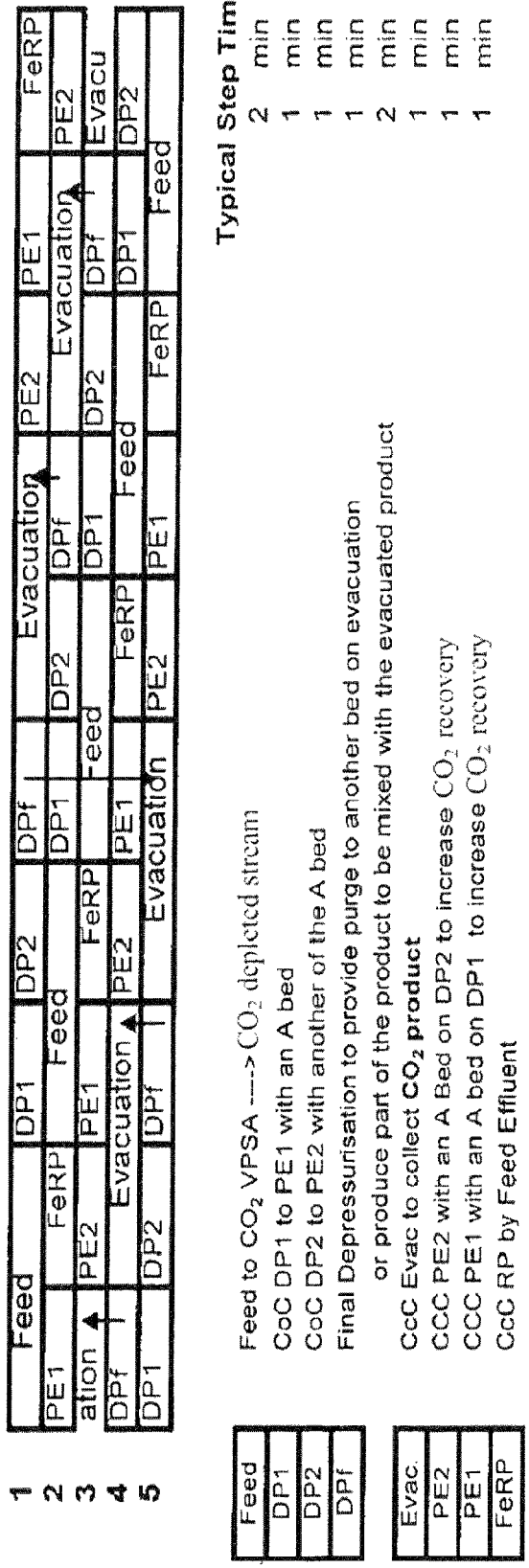
FIG. 13 illustrates an alternative cycle step chart for a carbon dioxide VPSA unit having five beds, two pressure equalization steps and flow through the evacuating bed, useful in the present invention.
Figure 14:
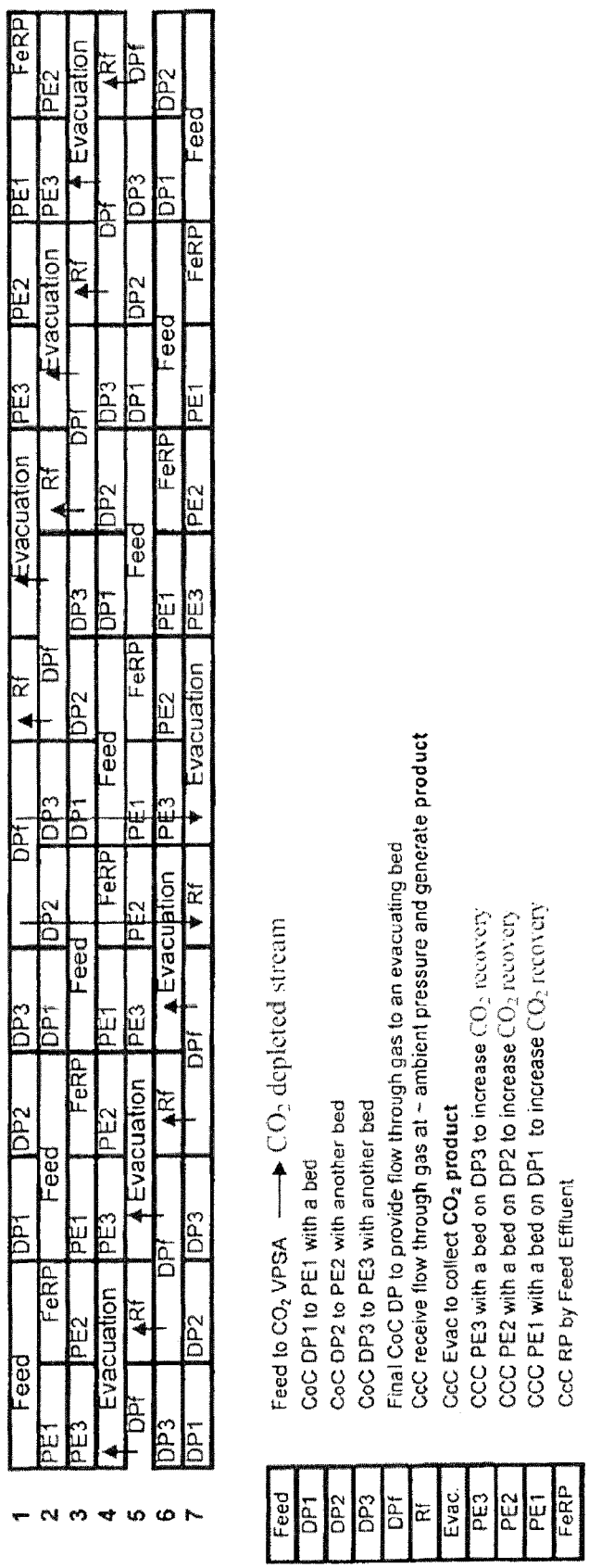
FIG. 14 illustrates another alternative cycle step chart for a carbon dioxide VPSA unit having seven beds, three pressure equalization steps and flow through the evacuating bed, useful in the present invention.

In one embodiment of VPSA stage 70, the processes provide for flow through the evacuating bed (see for example, FIGS. 10-14). The flow through embodiments can be accomplished using a varying number of beds and pressure equalization steps. For example, flow through the evacuating bed can be accomplished with six beds and three pressure equalization steps (FIGS. 10-14). Alternatively, flow through the evacuating bed can be accomplished with five beds and two pressure equalization steps (FIG. 13) or seven beds and three pressure equalization steps (FIG. 14). At any time during any of these processes, the beds will be in one of the following categories of steps: feed, depressurizations, evacuation, pressure equalizations, and repressurization. In addition, a purge step can be included in the cycle for the embodiment shown in FIG. 14.

Figure 15:
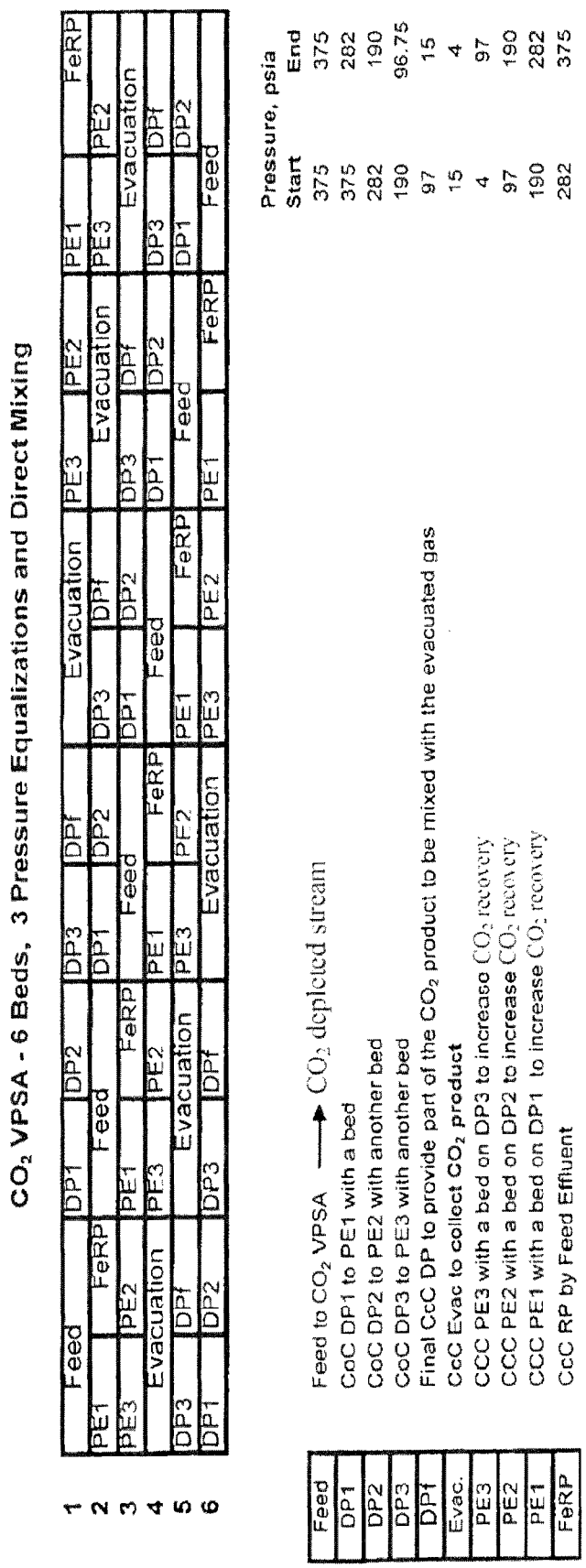
FIG. 15 illustrates a further alternative cycle step for a carbon dioxide VPSA unit having six beds, three pressure equalization steps and direct mixing, useful in the present invention.
Figure 16:
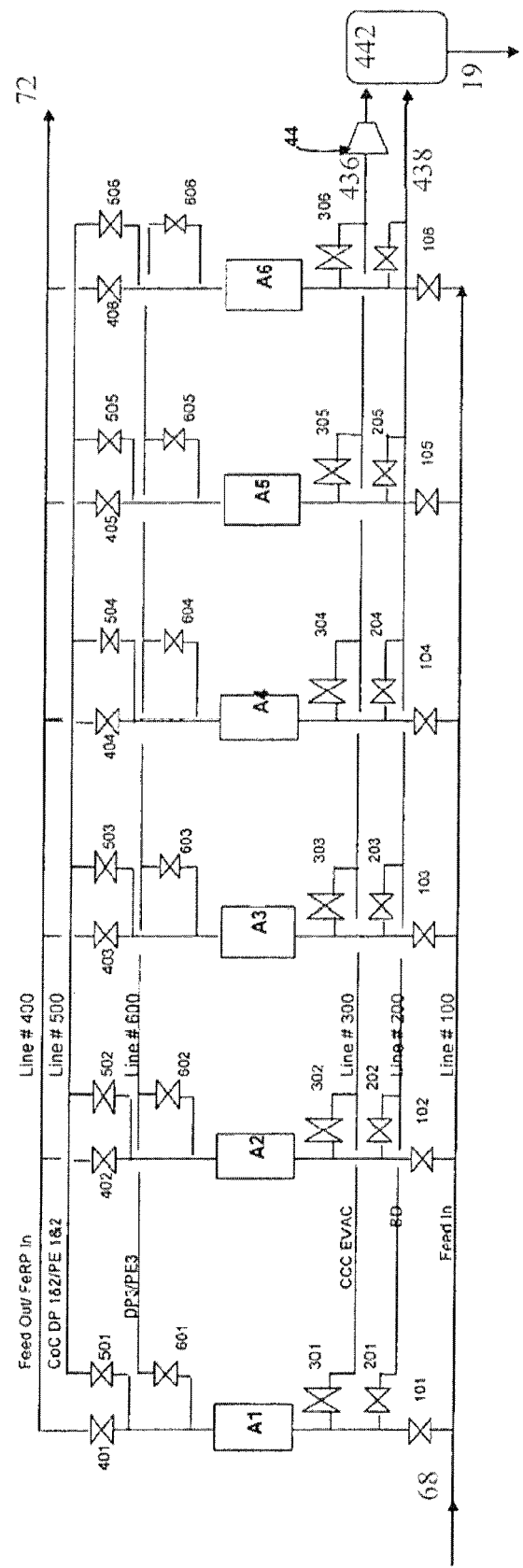
FIG. 16 shows a schematic drawing for the carbon dioxide VPSA unit of FIG. 15.
Figure 17:
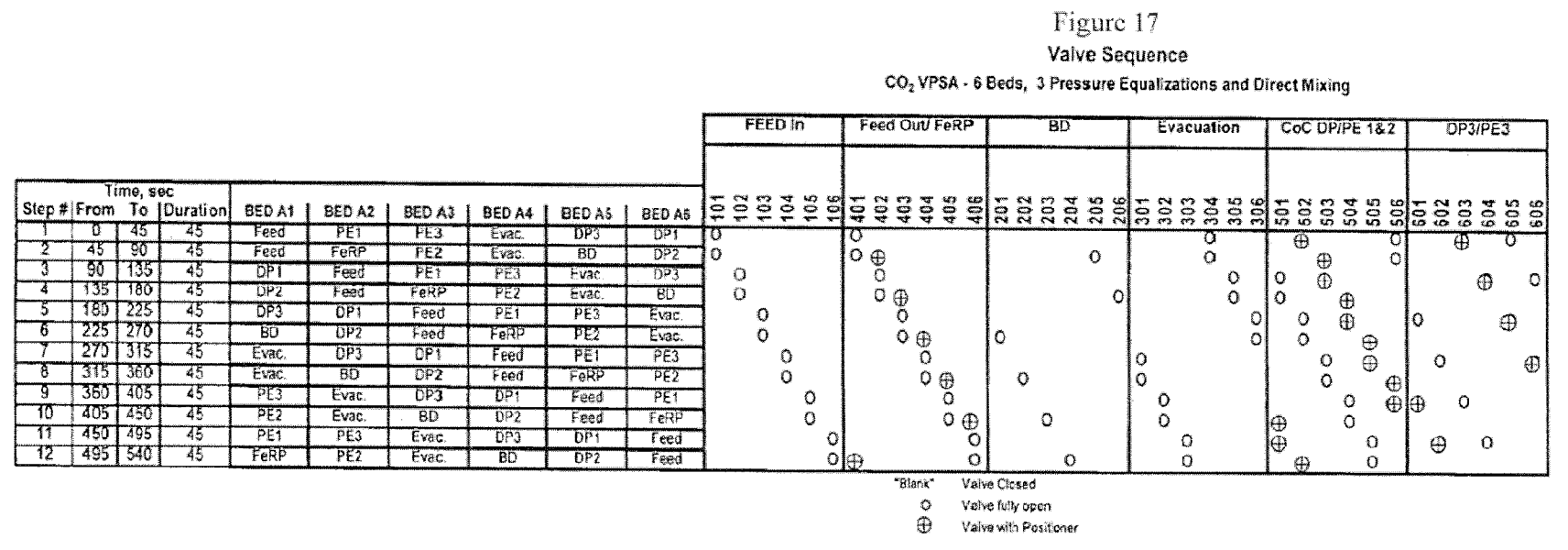
Figure 18:
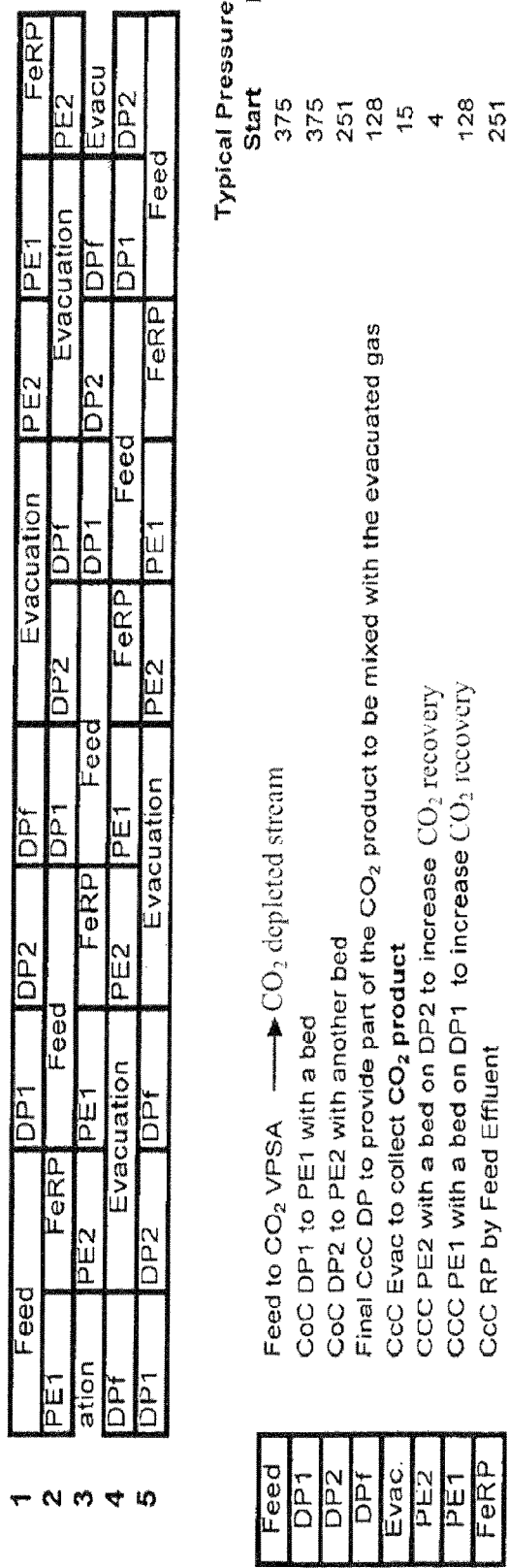
FIG. 18 illustrates yet another cycle step chart for a carbon dioxide VPSA unit having five beds, two pressure equalization steps and direct mixing, useful in the present invention.

In other alternative embodiments, the carbon dioxide product produced during the final depressurization step (DPf) is not passed through another bed under evacuation. Rather, this stream is mixed directly with the stream from the evacuating bed. In one preferred and exemplary embodiment, this can be accomplished with a carbon dioxide VPSA unit having six beds and three pressure equalization steps (FIGS. 15-17). In other embodiments, this can be accomplished by using a carbon dioxide VPSA unit having five beds and two pressure equalization steps (FIG. 18). At any time during any of these processes, the beds will be in one of the following categories of steps: feed, depressurizations, evacuation, pressure equalizations, and repressurization.

Combinations of flow through and direct mixing can also be used. In such embodiments, a portion of the stream produced during the depressurization step (DPf) flows through the bed under evacuation and the remainder is directly mixed with the stream exiting the bed under evacuation.

Figure 20:
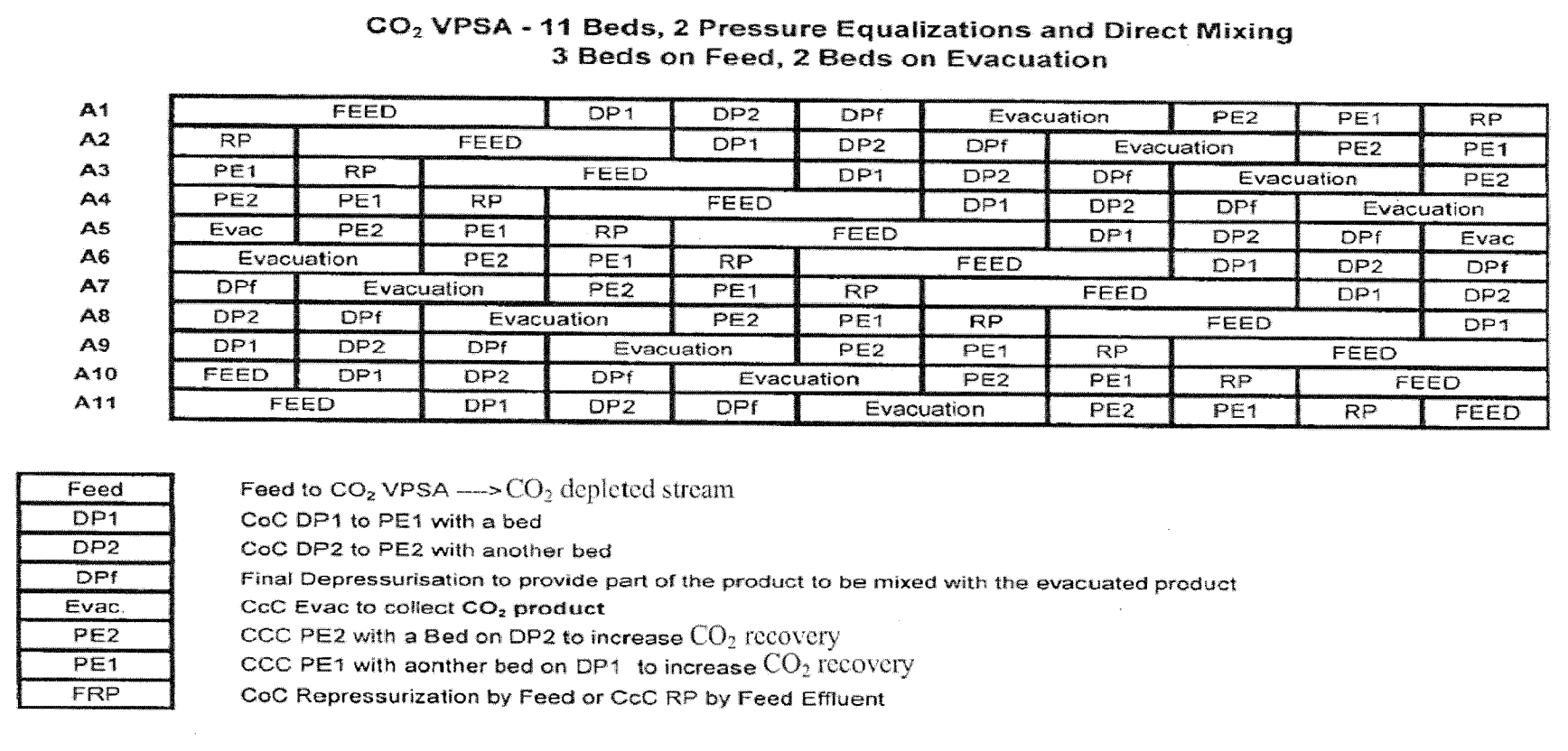

In embodiments where increased plant capacity is desirable, the embodiments shown in FIGS. 19 and 20 can be utilized. More specifically, FIG. 19 shows a cycle step chart for an embodiment of the present invention in which two pressure equalizations and eight beds are used with direct mixing. In this embodiment, two beds are continuously on feed and at least two beds are continuously under evacuation. This arrangement is expected to allow for an increase in the capacity of the plant. FIG. 20 illustrates a cycle step chart for an embodiment of the present invention in which two pressure equalizations and eleven beds are used with direct mixing. In this embodiment, three beds are continuously on feed and two beds are continuously under evacuation. This arrangement is also expected to allow for an increase in the capacity of the plant. At any time during any of these processes, the beds will be in one of the following categories of steps: feed, depressurizations, evacuation, pressure equalizations, and repressurization.

In any of the embodiments, each bed is preferably packed with at least two layers of adsorbents. The type and sizing of the adsorbent layer toward the feed end (i.e. a water-selective adsorbent layer) in the bed is selected to remove moisture in the feed stream such that any residual moisture does not deteriorate the performance of the main (i.e., carbon dioxide-selective) adsorbent layer. The water-selective adsorbent layer is also preferably capable of removing impurities (e.g., trace amounts of sulfur or heavy hydrocarbon compounds) from the feed stream, to the extent such impurities are present. The main, second adsorbent layer (i.e., the carbon dioxide-selective adsorbent layer) is used for selectively adsorbing carbon dioxide from the feed stream after sufficient moisture has been removed.

For the first adsorbent layer (i.e. the water-selective adsorbent layer, adsorbents such as activated alumina, silica gel or zeolite molecular sieve are preferred. These adsorbents are intended to be illustrative and other adsorbents capable of removing sufficient moisture are also suitable for use in accordance with the present invention. Preferred characteristics for such adsorbent(s) include: high crush strength capabilities, high attrition resistance, large bulk density, low inter-particle void, high heat capacity, large thermal conductivity, low-pressure drop and stable in liquid water.

The main layer of adsorbent (i.e., the carbon dioxide-selective adsorbent layer) following the water-selective adsorbent layer preferably has the following characteristics: high selectivity, high working capacity, fast kinetics and low heat of adsorption. Typical examples of such adsorbents include, but are not limited to: are NaY, HY, NaX, silica gel, and activated carbon. Other desired physical properties of the main layer adsorbent (i.e. the carbon dioxide-selective layer) include: high crush strength, high attrition resistance, large bulk density, low inter-particle void, high heat capacity, large thermal conductivity and low-pressure drop during the feed and evacuation steps.

Those skilled in the art will appreciate that a composite mixed layer containing both adsorbents could be used in the present invention so long as the characteristics of the adsorbents are satisfied.

Figure 10:
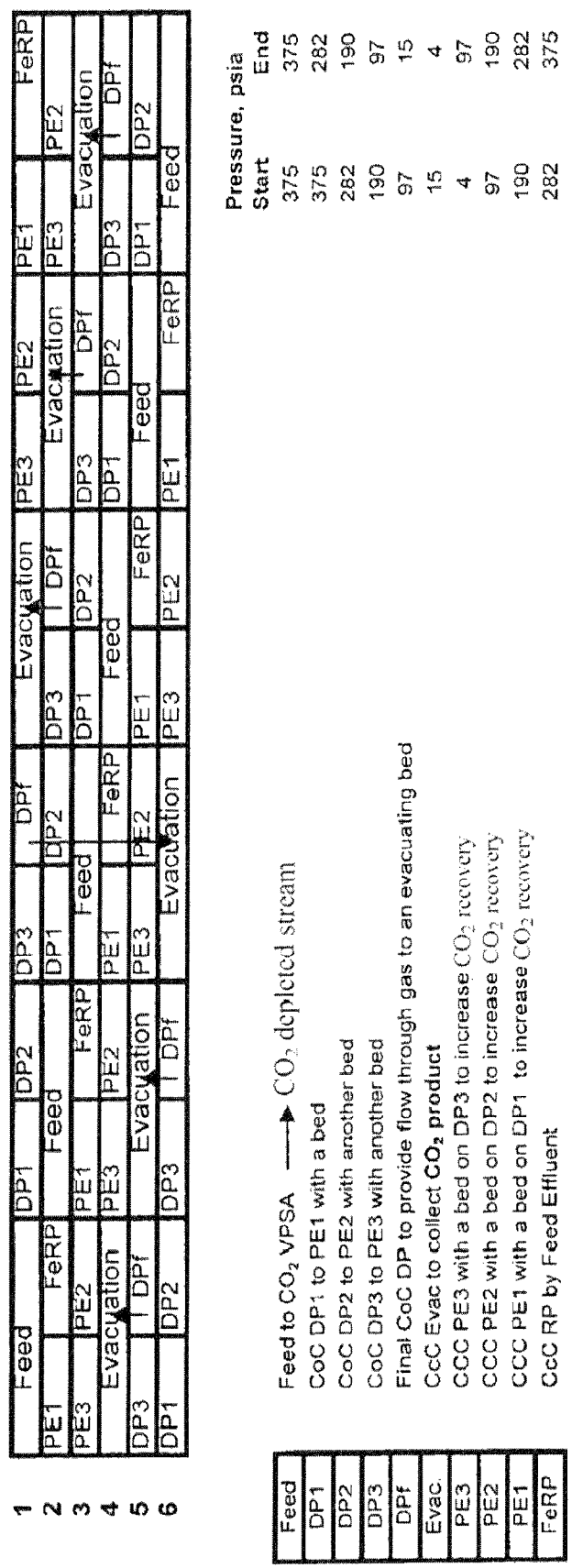
FIG. 10 illustrates a cycle step chart for a carbon dioxide VPSA unit having six beds, three pressure equalization steps and flow through the evacuating bed, useful in the present invention.
Figure 11:
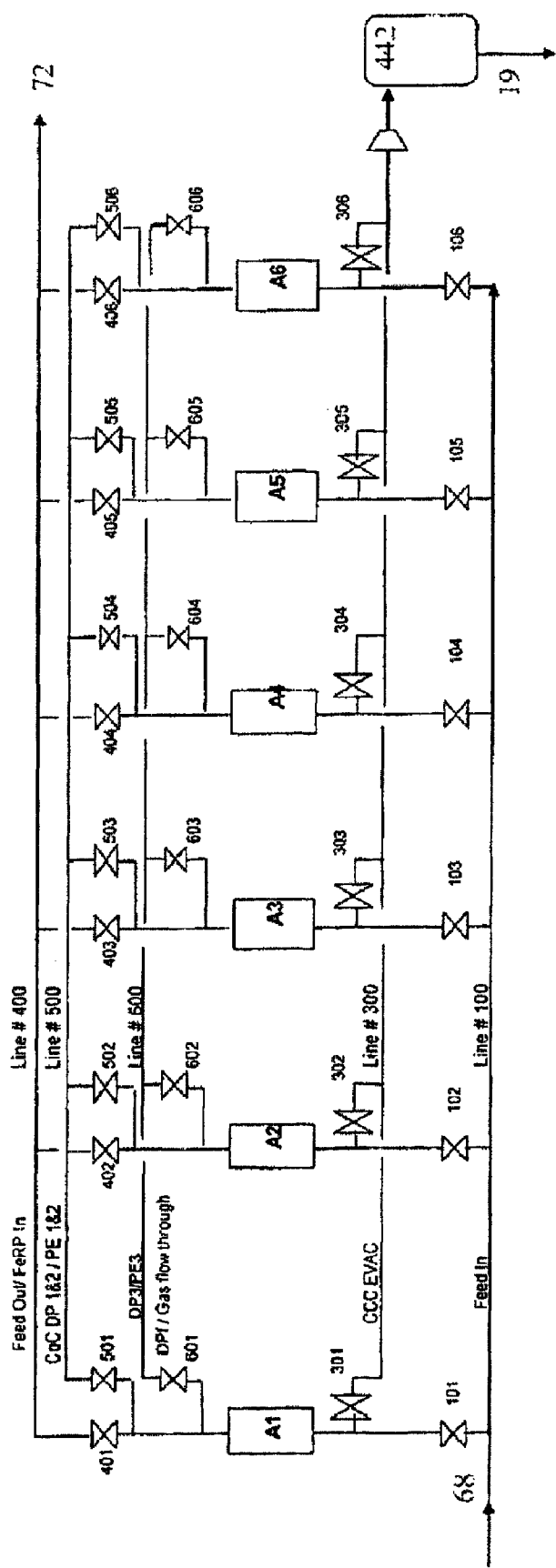
FIG. 11 shows a schematic drawing for a carbon dioxide VPSA unit of FIG. 10.

Referring now to FIGS. 10-12, a first embodiment of the present invention having six beds (A1-A6) and using ten steps with flow through the evacuating bed to produce enriched carbon dioxide is illustrated. The process steps include:

1. Feed Step. Feed stream 68 containing carbon dioxide at a high pressure between about 100-500 psia (for example, about 375 psia) is fed to the carbon dioxide VPSA unit. After a predetermined time or after carbon dioxide breakthrough from the bed on the feed 68, the feed step is terminated.

2. Co-Current (CoC) Depressurization 1 (DP1). The carbon dioxide VPSA bed, which has finished the feed step is now at high feed pressure (e.g., 100-500 psia), is depressurized to a medium pressure (e.g., 80-400 psia) in a direction the same (shown in FIG. 10) or opposite (not shown in FIG. 10) as the feed flow.

3. Co-Current (CoC) Depressurization 2 (DP2). The carbon dioxide VPSA bed, which is now at some medium pressure (e.g., 80-400 psia), is further depressurized to a lower pressure (e.g., 60-300 psia) in a direction the same as (shown in FIG. 10) or opposite (not shown in FIG. 10) as the feed flow.

4. Co-Current (CoC) Depressurization 3 (DP3). The carbon dioxide VPSA bed, which is now at some medium pressure (e.g., 60-300 psia), is further depressurized to a lower pressure (e.g., 50-200 psia) in a direction the same as (shown in FIG. 10) or opposite (not shown in FIG. 10) as the feed flow.

5. Final Depressurization (DPf). The carbon dioxide VPSA bed, which is now at a pressure lower than at the start of step 4 (about 50-200 psia) is further depressurized to a pressure close to ambient (about 20 psia) in a direction the same as (shown in FIG. 10) and/or the opposite (not shown in FIG. 10) the feed flow.

As shown by the arrows in FIG. 10 (i.e. arrows from DPf to bed under evacuation), the stream from this step (DPf) flows through the bed under evacuation (e.g. in FIG. 10: bed 1 to bed 6, bed 2 to bed 1, bed 3 to bed 2, bed 4 to bed 3, bed 5 to bed 4 or bed 6 to bed 5 on the respective cycle steps).

6. Evacuation. The carbon dioxide VPSA bed, which is now close to ambient pressure (about 20 psia), is evacuated to a predetermined low pressure, a subambient pressure (about 1-12 psia) in a direction the same as (not shown in FIG. 10) or opposite (shown in FIG. 10) to the feed flow. As shown in FIG. 10 and outlined in the description of step 5 (DPf) above, this bed is receiving gas from another bed in the DPf step. The gas from the bed under evacuation constitutes the carbon dioxide product stream.

7. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 10) or opposite (shown in FIG. 10) to the feed flow. This step increases carbon dioxide recovery by keeping the carbon dioxide from step 4 within the VPSA system. This minimizes carbon dioxide loss by eliminating the need to send the carbon dioxide to a waste stream.

8. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 10) or opposite (shown in FIG. 10) to the feed flow. This step increases carbon dioxide recovery by keeping the carbon dioxide from step 3 within the VPSA system. This minimizes carbon dioxide loss by eliminating the need to send the carbon dioxide to a waste stream.

9. Countercurrent Pressure (CcC) Equalization 1 (PE1). The bed pressure equalized in step 8 is further pressure equalized to a pressure range of the gas produced in step 2 (DP1) (i.e., to about 80-400 psia) in a direction the same as (not shown in FIG. 10) or opposite (shown in FIG. 10) to the feed flow. This step further increases carbon dioxide recovery by keeping the carbon dioxide from step 2 within the VPSA system. This minimizes carbon dioxide loss by eliminating the need to send the carbon dioxide to a waste stream.

10. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The ten-step process described is for one cycle for one bed in the carbon dioxide VPSA unit. The above ten steps for this flow through the evacuating bed embodiment are carried out in a cyclic manner with the other beds in the unit such that feed-into and feed-effluent from step 1 are continuous. In addition, the evacuation step (number 6) is designed to be continuous. This ensures that the vacuum pump operates continuously, and that there is no break in feed-into the carbon dioxide VPSA unit. Six adsorption beds are utilized in the embodiment described above to maintain the continuity of the key process steps.

Exemplary corresponding hardware and a flow schematic of the carbon dioxide VPSA process corresponding to the cycle shown in FIG. 10 is depicted in FIG. 11. The various valves in FIG. 11 can be operated in the manner illustrated in FIG. 12 to carry out the ten steps in the six-bed process as described hereinabove. It should be appreciated that pressures and step durations shown are only for illustrative purposes. Those skilled in the art will appreciate that other combinations of pressures and step durations may be used.

As can be appreciated from the above description, the present invention thus relies upon depressurizations of at least one carbon dioxide-selective adsorbent from high pressure to low pressure to increase carbon dioxide concentration in the bed. After carbon dioxide concentration is increased, it produces the carbon dioxide product by further pressure reduction. This became possible based on the recognition that for some adsorbents, pressure reduction from high to low pressure increases carbon dioxide concentration on the adsorbent.

In the embodiment shown in FIGS. 10-12 and as described, the gas produced during the final depressurization (step number 5, DPf) flows through the bed under evacuation as shown by the arrows in the cycle step chart in FIG. 10.

Alternative and additional exemplary embodiments that utilize the final depressurization gas stream (DPf) flow through the evacuating bed are illustrated in FIGS. 13 and 14.

Referring now to FIG. 13, a cycle step chart for an eight-step process that utilizes five beds and two pressure equalization steps is shown. These cycle steps are carried out in a similar to those steps described above with reference to FIG. 10, except that steps DP3 and PE3 have been eliminated. More specifically, the cycle steps for FIG. 13 include the following:

1. Feed Step. Feed stream 68 containing carbon dioxide at a high pressure between about 100-500 psia (for example, about 375 psia) is fed to carbon dioxide VPSA unit 70. After a predetermined time or after carbon dioxide breakthrough from the bed on the feed 68, the feed step is terminated.

2. Co-Current (CoC) Depressurization 1 (DP1). The carbon dioxide VPSA bed, which has finished the feed step is now at high feed pressure (e.g., 100-500 psia), is depressurized to a medium pressure (e.g., 80-400 psia) in a direction the same (shown in FIG. 13) or opposite (not shown in FIG. 13) as the feed flow.

3. Co-Current (CoC) Depressurization 2 (DP2). The carbon dioxide VPSA bed, which is now at some medium pressure (e.g., 80-400 psia), is further depressurized to a lower pressure (e.g., 60-300 psia) in a direction the same as (shown in FIG. 13) or opposite (not shown in FIG. 13) as the feed flow.

4. Final Depressurization (DPf). The carbon dioxide VPSA bed, which is now at a pressure lower than at the start of step 4 (about 50-200 psia) is further depressurized to a pressure close to ambient (about 20 psia) in a direction the same as (shown in FIG. 13) and/or the opposite (not shown in FIG. 13) the feed flow.

As shown by the arrows in FIG. 13 (i.e. arrows from DPf to bed under evacuation), the stream from this step (DPf) flows through the bed under evacuation (e.g. as shown in FIG. 13: bed 1 to bed 5, bed 2 to bed 1, bed 3 to bed 2, bed 4 to bed 3 or bed 5 to bed 4 on the respective cycle steps).

5. Evacuation. The carbon dioxide VPSA bed, which is now close to ambient pressure (about 20 psia), is evacuated to a predetermined low pressure, a subambient pressure (about 1-12 psia) in a direction the same as (not shown in FIG. 13) or opposite (shown in FIG. 13 to the feed flow. As shown in FIG. 13 and as outlined in the description of step 4 (DPf) above, this bed is receiving gas from another bed in the DPf step for the duration of the DPf step. The gas from the bed under evacuation constitutes the carbon dioxide product stream.

6. Countercurrent (CcC) Pressure Equalization 2 (PE2). The evacuated bed is now pressure equalized to a pressure range of the gas produced in step 3 (DP2) (i.e., to about 60-300 psia) in a direction the same as (not shown in FIG. 13) or opposite (shown in FIG. 13) to the feed flow. This step increases carbon dioxide recovery by keeping the carbon dioxide from step 3 within the VPSA system. This minimizes carbon dioxide loss by eliminating the need to send the carbon dioxide to a waste stream.

7. Countercurrent Pressure (CcC) Equalization 1 (PE1). The bed pressure equalized in step 6 is further pressure equalized to a pressure range of the gas produced in step 1 (DP1) (i.e., to about 80-400 psia) in a direction the same as (not shown in FIG. 13) or opposite (shown in FIG. 13) to the feed flow. This step further increases carbon dioxide recovery by keeping the carbon dioxide from step 2 within the VPSA system. This minimizes carbon dioxide loss by eliminating the need to send the carbon dioxide to a waste stream.

8. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The eight-step process described is for one cycle for one bed in the carbon dioxide VPSA unit. The above eight steps for this flow through the evacuating bed embodiment are carried out in a cyclic manner with the other beds in the unit such that feed-into and feed-effluent from step 1 are continuous. In addition, the evacuation step (number 5) is designed to be continuous. This ensures that the vacuum pump operates continuously, and that there is no break in feed-into the carbon dioxide VPSA unit. Five adsorption beds are utilized in the embodiment described above to maintain the continuity of the key process steps.

Referring now to FIG. 14, a cycle step chart for an eleven-step process that utilizes seven beds and three pressure equalization steps is shown. These cycle steps are carried out in a similar manner to those steps described above with reference to FIG. 10, except that an additional step (Rf) is included between the final depressurization step (DPf) and the evacuation step. More specifically, the cycle steps for FIG. 14 include the following:

1. Feed Step. Feed stream 68 containing carbon dioxide at a high pressure between about 100-500 psia (for example, about 375 psia) is fed to carbon dioxide VPSA unit 70. After a predetermined time or after carbon dioxide breakthrough from the bed on the feed 68, the feed step is terminated.

2. Co-Current (CoC) Depressurization 1 (DP1). The carbon dioxide VPSA bed, which has finished the feed step is now at high feed pressure (e.g., 100-500 psia), is depressurized to a medium pressure (e.g., 80-400 psia) in a direction the same (shown in FIG. 14) or opposite (not shown in FIG. 14) as the feed flow.

3. Co-Current (CoC) Depressurization 2 (DP2). The carbon dioxide VPSA bed, which is now at some medium pressure (e.g., 80-400 psia), is further depressurized to a lower pressure (e.g., 60-300 psia) in a direction the same as (shown in FIG. 14) or opposite (not shown in FIG. 14) as the feed flow.

4. Co-Current (CoC) Depressurization 3 (DP3). The carbon dioxide VPSA bed, which is now at some medium pressure (e.g., 60-300 psia), is further depressurized to a lower pressure (e.g., 50-200 psia) in a direction the same as (shown in FIG. 14) or opposite (not shown in FIG. 14) as the feed flow.

5. Final Depressurization (DPf). The carbon dioxide VPSA bed, which is now at a pressure lower than at the start of step 4 (about 50-200 psia) is further depressurized to a pressure close to ambient (about 20 psia) in a direction the same as (shown in FIG. 14) and/or the opposite (not shown in FIG. 14) the feed flow.

6. Receive Purge (Rf). The stream produced by DPf (e.g., bed 1 in FIG. 14) is fed to another bed having completed DPf, but not yet under evacuation (e.g., bed 7 in FIG. 14). During this time (duration of the Rf step), the effluent (e.g., bed 7 in FIG. 14) flows to tank 442 as carbon dioxide product. During the remaining time period of DPf of bed 1, the gas flows through the bed under evacuation (e.g., bed 7 in FIG. 14).

7. Evacuation. The carbon dioxide VPSA bed, which is now close to ambient pressure (about 20 psia), is evacuated to a predetermined low pressure, a subambient pressure (about 1-12 psia) in a direction the same as (not shown in FIG. 14) or opposite (shown in FIG. 14) to the feed flow. As shown in FIG. 14, this bed (bed 1) is receiving gas from another bed in the DPf step (bed 2). The gas from the bed under evacuation constitutes at least part of the carbon dioxide product stream.

8. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 14) or opposite (shown in FIG. 14) to the feed flow. This step increases carbon dioxide recovery by keeping the carbon dioxide from step 4 within the VPSA system. This minimizes carbon dioxide loss by eliminating the need to send the carbon dioxide to a waste stream.

9. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 14) or opposite (shown in FIG. 14) to the feed flow. This step increases carbon dioxide recovery by keeping the carbon dioxide from step 3 within the VPSA system. This minimizes carbon dioxide loss by eliminating the need to send the carbon dioxide to a waste stream.

10. Countercurrent Pressure (CcC) Equalization 1 (PE1). The bed pressure equalized in step 9 is further pressure equalized to a pressure range of the gas produced in step 2 (DP1) (i.e., to about 80-400 psia) in a direction the same as (not shown in FIG. 14) or opposite (shown in FIG. 14) to the feed flow. This step further increases carbon dioxide recovery by keeping the carbon dioxide from step 2 within the VPSA system. This minimizes carbon dioxide loss by eliminating the need to send the carbon dioxide to a waste stream.

11. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The eleven-step process described is for one cycle for one bed in the carbon dioxide VPSA unit. The above eleven steps for this flow through the evacuating bed embodiment are carried out in a cyclic manner with the other beds in the unit such that feed-into and feed-effluent from step 1 are continuous. In addition, the evacuation step (number 7) is designed to be continuous. This ensures that the vacuum pump operates continuously, and that there is no break in feed-into the carbon dioxide VPSA unit. Seven adsorption beds are utilized in the embodiment described above to maintain the continuity of the key process steps.

Referring now to FIGS. 15-17, an embodiment of the present invention having six beds (A1-A6) and using ten steps with direct mixing of carbon dioxide gas from the DPf step and the evacuation step to produce a final carbon dioxide-enriched gas is illustrated. The process steps include:

1. Feed Step. Feed stream 68 containing carbon dioxide at a high pressure (for example, about 375 psia) is fed to carbon dioxide VPSA unit 70. After a predetermined time or after carbon dioxide breakthrough from the bed on the feed 68, the feed step is terminated.

2. Co-Current (CoC) Depressurization 1 (DP1). The carbon dioxide VPSA bed, which has finished the feed step is now at high feed pressure (e.g., 100-500 psia), is depressurized to a medium pressure (e.g., 80-400 psia) in a direction the same (shown in FIG. 15) or opposite (not shown in FIG. 15) as the feed flow.

3. Co-Current (CoC) Depressurization 2 (DP2). The carbon dioxide VPSA bed, which is now at some medium pressure (e.g., 80-400 psia), is further depressurized to a lower pressure (e.g., 60-300 psia) in a direction the same as (shown in FIG. 15) or opposite (not shown in FIG. 15) as the feed flow.

4. Co-Current (CoC) Depressurization 3 (DP3). The carbon dioxide VPSA bed, which is now at some medium pressure (e.g., 60-300 psia), is further depressurized to a lower pressure (e.g., 50-200 psia) in a direction the same as (shown in FIG. 15) or opposite (not shown in FIG. 15) as the feed flow.

5. Final Depressurization (DPf). The carbon dioxide VPSA bed, which is now at a pressure lower than at the start of step 4 (about 50-200 psia) is further depressurized to a pressure close to ambient (about 20 psia) in a direction the same as (not shown in FIG. 15) and/or the opposite (shown in FIG. 15) the feed flow to produce carbon dioxide product 438 shown in FIG. 16. This stream may constitute part of the carbon dioxide product (stream 19).

6. Evacuation. The carbon dioxide VPSA bed, which is now close to ambient pressure (about 20 psia), is evacuated to a predetermined low pressure, a subambient pressure (about 1-12 psia) in a direction the same as (not shown in FIG. 15) or opposite (shown in FIG. 15) to the feed flow. The gas from the bed under evacuation (stream 436 in FIG. 16) constitutes part of the carbon 7. dioxide product stream (stream 19). Optionally, stream 436 can be further compressed using a blower (not shown) prior to passing to tank 442.

8. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 15) or opposite (shown in FIG. 15) to the feed flow. This step increases carbon dioxide recovery by keeping the carbon dioxide from step 4 within the VPSA system. This minimizes carbon dioxide loss by eliminating the need to send the carbon dioxide to a waste stream.

9. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 15) or opposite (shown in FIG. 15) to the feed flow. This step increases carbon dioxide recovery by keeping the carbon dioxide from step 3 within the VPSA system. This minimizes carbon dioxide loss by eliminating the need to send the carbon dioxide to a waste stream.

10. Countercurrent Pressure (CcC) Equalization 1 (PE1). The bed pressure equalized in step 8 is further pressure equalized to a pressure range of the gas produced in step 2 (DP1) (i.e., to about 80-400 psia) in a direction the same as (not shown in FIG. 15) or opposite (shown in FIG. 15) to the feed flow. This step further increases carbon dioxide recovery by keeping the carbon dioxide from step 2 within the VPSA system. This minimizes carbon dioxide loss by eliminating the need to send the carbon dioxide to a waste stream.

11. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

As further shown in FIG. 15, carbon dioxide product 19 is formed of carbon dioxide from streams 438 (step 6) and 436 (step 7) fed to product tank 442. Product 19 is expected to have a carbon dioxide purity level of approximately 80 mole percent or greater.

The ten-step process described is for one cycle for one bed in the carbon dioxide VPSA unit. The above ten steps for this direct mixing embodiment are carried out in a cyclic manner with the other beds in the unit such that feed-into and feed-effluent from step 1 are continuous. In addition, the evacuation step (number 6) is designed to be continuous. This ensures that the vacuum pump operates continuously, and that there is no break in feed-into the carbon dioxide VPSA unit. Six adsorption beds are utilized in the embodiment described above to maintain the continuity of the key process steps.

Exemplary corresponding hardware and a flow schematic of the carbon dioxide VPSA process corresponding to the cycle shown FIG. 15 is depicted in FIG. 16. The various valves in FIG. 16 can be operated in the manner illustrated in FIG. 17 to carry out the ten steps in the six-bed process as described hereinabove. It should be appreciated that pressures and step durations shown are only for illustrative purposes. Those skilled in the art will appreciate that other combinations of pressures and steps may be used.

In the embodiment shown in FIGS. 15-17 and as described herein, the gas produced during the final depressurization step (DPf) is mixed with the evacuated gas from step number 6.

Another exemplary embodiment that utilizes direct mixing of the final depressurization gas stream (DPf) with the gas produced by evacuation bed is illustrated in FIG. 18.

Referring now to FIG. 18, a cycle step chart for an eight-step process that utilizes five beds and two pressure equalization steps is shown. These cycle steps are carried out in a similar manner to those steps described above with reference to FIG. 15, except that steps DP3 and PE3 have been eliminated. More specifically, the cycle steps for FIG. 18 include the following:

1. Feed Step. Feed stream 68 containing carbon dioxide at a high pressure between about 100-500 psia (for example, about 375 psia) is fed to carbon dioxide VPSA unit 70. After a predetermined time or after carbon dioxide breakthrough from the bed on the feed 68, the feed step is terminated.

2. Co-Current (CoC) Depressurization 1 (DP1). The carbon dioxide VPSA bed, which has finished the feed step is now at high feed pressure (e.g., 100-500 psia), is depressurized to a medium pressure (e.g., 80-400 psia) in a direction the same (shown in FIG. 18) or opposite (not shown in FIG. 18) as the feed flow.

3. Co-Current (CoC) Depressurization 2 (DP2). The carbon dioxide VPSA bed, which is now at some medium pressure (e.g., 80-400 psia), is further depressurized to a lower pressure (e.g., 60-300 psia) in a direction the same as (shown in FIG. 18) or opposite (not shown in FIG. 18) as the feed flow.

4. Final Depressurization (DPf). The carbon dioxide VPSA bed, which is now at a pressure lower than at the start of step 4 (about 50-200 psia) is further depressurized to a pressure close to ambient (about 20 psia) in a direction the same as (not shown in FIG. 18) and/or the opposite (shown in FIG. 18) the feed flow to produce carbon dioxide product 438. This stream may constitute part of the carbon dioxide product (stream 19).

5. Evacuation. The carbon dioxide VPSA bed, which is now close to ambient pressure (about 20 psia), is evacuated to a predetermined low pressure, a subambient pressure (about 1-12 psia) in a direction the same as (not shown in FIG. 18) or opposite (shown in FIG. 18) to the feed flow. The gas from the bed under evacuation (stream 36*a* in FIG. 16) constitutes part of the carbon dioxide product stream (stream 19). Optionally, stream 436 can be further compressed using a blower (not shown) prior to passing to tank 442.

6. Countercurrent (CcC) Pressure Equalization 2 (PE2). The evacuated bed is now pressure equalized to a pressure range of the gas produced in step 3 (DP2) (i.e., to about 60-300 psia) in a direction the same as (not shown in FIG. 18) or opposite (shown in FIG. 18) to the feed flow. This step increases carbon dioxide recovery by keeping the carbon dioxide from step 3 within the VPSA system. This minimizes carbon dioxide loss by eliminating the need to send the carbon dioxide to a waste stream.

7. Countercurrent Pressure (CcC) Equalization 1 (PE1). The bed pressure equalized in step 6 is further pressure equalized to a pressure range of the gas produced in step 2 (DP1) (i.e., to about 80-400 psia) in a direction the same as (not shown in FIG. 18) or opposite (shown in FIG. 18) to the feed flow. This step further increases carbon dioxide recovery by keeping the carbon dioxide from step 2 within the VPSA system. This minimizes carbon dioxide loss by eliminating the need to send the carbon dioxide to a waste stream.

8. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The carbon dioxide product stream 19 is formed of carbon dioxide from streams 438 (step 4) and 436 (step 5) in product tank 442.

The eight-step process described is for one cycle for one bed in the carbon dioxide VPSA unit. The above eight steps for this direct mixing embodiment are carried out in a cyclic manner with the other beds in the unit such that feed-into and feed-effluent from step 1 are continuous. In addition, the evacuation step (number 5) is designed to be continuous. This ensures that the vacuum pump operates continuously, and that there is no break in feed-into the carbon dioxide VPSA unit. Five adsorption beds are utilized in the embodiment described above to maintain the continuity of the key process steps.

It is also expected that the present invention can be modified to produce higher amounts of carbon dioxide and thus high plant capacity. For example, one may need or desire to process higher feed flow rates than may be handled by a single vacuum train or single vessel (due to fluidization or transportation limitations). In such situations, the process steps may be arranged such that at least two beds are on feed and at least two beds are under evacuation all the time. Such exemplary cycle step charts and arrangement are shown in FIGS. 19 and 20. Alternatively or in addition, multiple trains can be used.

Absorption

When stage 70 uses physical absorption with solvents such as selexol and rectisol, it can be placed just downstream of subambient-temperature processing stage 60. The carbon dioxide-depleted stream from such a physical absorption unit will be generally free of moisture. Physical absorption units process vent stream 68 from stage 60 and produce carbon dioxide-rich stream 19 and carbon dioxide-lean stream 72.

When stage 70 uses chemical absorption with reactant streams such as an aqueous solution of alkyl-substituted amine, ammonia or potassium carbonate, stream 68 is passed to the chemical absorption system 70 where it is treated by any known method in which the gaseous stream 68 is contacted with an aqueous solution of alkylamine, ammonia or potassium carbonate to absorb carbon dioxide from the gaseous stream into the aqueous stream, and the carbon dioxide is subsequently stripped from the resulting carbon dioxide-enriched aqueous stream.

Figure 21:
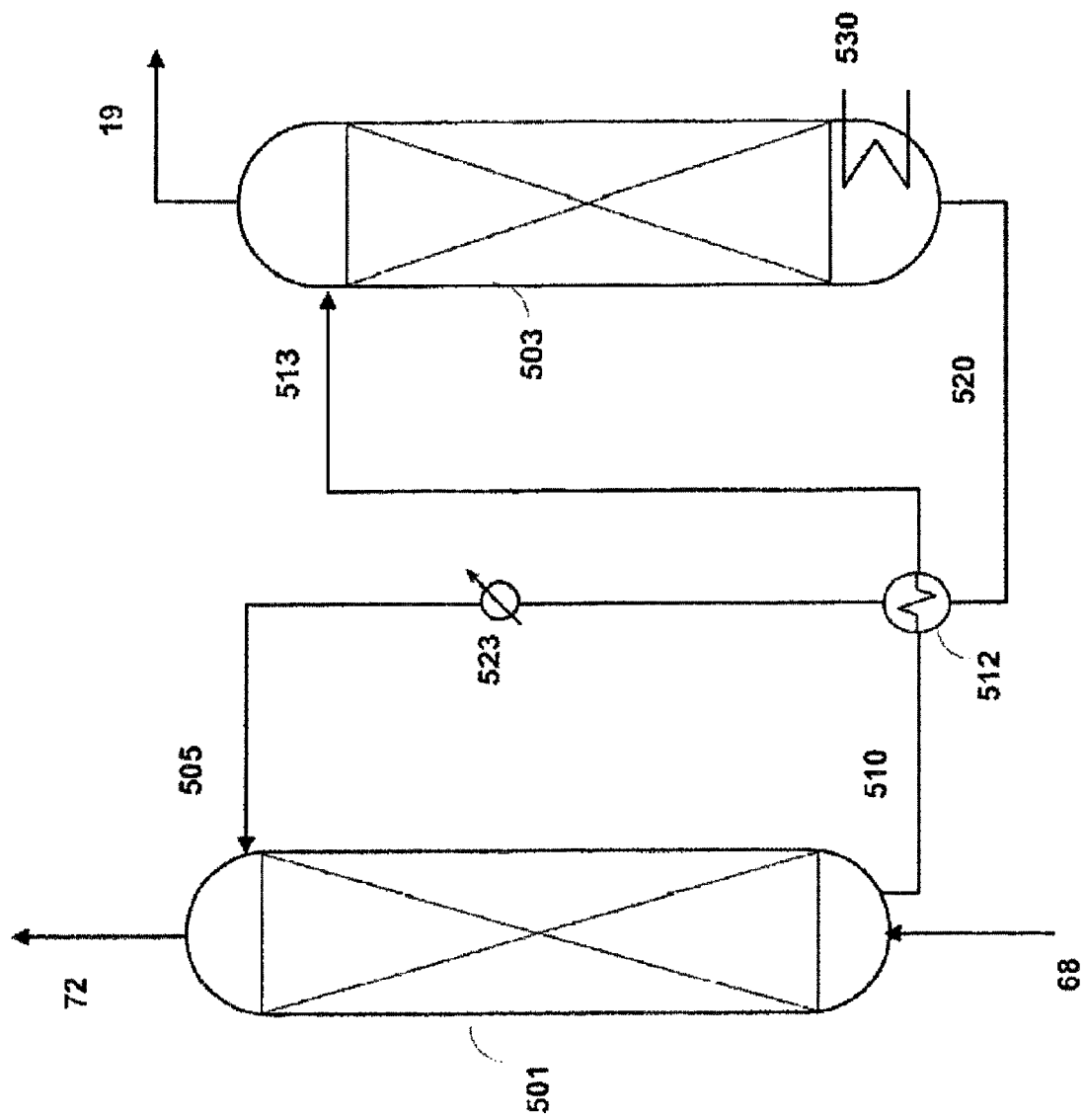
FIG. 21 is a diagram of a process useful in employing absorption in the method of the present invention.

FIG. 21 shows a flowsheet applicable to physical absorption and chemical absorption based carbon dioxide separation systems. The carbon dioxide-containing stream 68 is introduced into absorber 501 from the bottom. Stream 505 of solvent (as that term is used respectively with respect to physical absorption and chemical absorption processes) is fed to absorber 501 from the top. The solvent absorbs carbon dioxide from the feed stream. The resulting carbon dioxide-laden stream 510 is heated in heat exchanger 512 by recovering heat from carbon dioxide-lean solvent 520. The heated carbon dioxide-laden stream 513 is fed to the stripper 503. Optionally, the stripper is heated from the bottom by supplying heat via reboiler 530. A carbon dioxide-rich stream 19 is recovered from the top of stripper 503. The carbon dioxide-lean solvent 520 is cooled in heat exchanger 512 and then in cooler 523 and recycled to absorber 501 as stream 505.

What is claimed is:

1. A process for treating gaseous carbon dioxide, comprising
    (A) providing a gaseous feed stream of carbon dioxide that also comprises NOx and sulfur dioxide, and that is at a pressure of at least 2 bar;
    (B) contacting NOx-rich sulfuric acid with said gaseous feed stream and $NO_2$ desorbed in step (B) to strip NOx from said NOx-rich sulfuric acid and form NOx-reduced sulfuric acid and NOx-augmented gaseous carbon dioxide that comprises $SO_2$ and $NO_2$;
    (C) converting NO in said NOx-reduced sulfuric acid to $NO_2$, and desorbing said $NO_2$ from said NOx-reduced sulfuric acid to form NOx-lean sulfuric acid and desorbed $NO_2$;
    (D) controlling the amount of desorbed $NO_2$ contacted with NOx-rich sulfuric acid in step (B) by converting desorbed $NO_2$ to nitric acid and NO, and recovering said nitric acid;
    (E) reacting water and oxygen with the NOx-augmented gaseous carbon dioxide to form NOx-rich sulfuric acid and $SO_2$-depleted NOx-containing carbon dioxide;
    (F) absorbing NOx from said $SO_2$-depleted NOx-containing carbon dioxide into one or both of said NOx-reduced sulfuric acid and said NOx-lean sulfuric acid to form NOx-rich sulfuric acid and NOx-lean $SO_2$-depleted carbon dioxide;
    (G) subjecting the NOx-lean $SO_2$-depleted carbon dioxide to a subambient-temperature recovery process, employing refrigeration provided by expansion of at least one liquid carbon dioxide product stream formed by said recovery process, to produce at least one gaseous carbon dioxide product stream and at least one gaseous carbon dioxide-containing vent stream;
    (H) separating the vent stream into a carbon dioxide-rich stream and a carbon dioxide-depleted stream, by pressure swing adsorption or by physical or chemical absorption; and
    (I) recycling said carbon dioxide-rich stream to said carbon dioxide-containing feed stream.

2. A process according to claim 1 wherein in step (G) said refrigeration is provided only by expansion of said at least one liquid carbon dioxide product stream formed by said subambient-temperature recovery process.

3. A process according to claim 1 wherein NOx-rich sulfuric acid formed in one or both of steps (E) and (F) is contacted in step (B) with said gaseous feed stream.

4. A process according to claim 1 wherein NOx-rich sulfuric acid formed in both of steps (E) and (F) is contacted in step (B) with said gaseous feed stream.

5. A process according to claim 1 wherein NOx is absorbed in step (D) into NOx-reduced sulfuric acid formed in step (B).

6. A process according to claim 1 wherein NOx is absorbed in step (D) into NOx-lean sulfuric acid formed in step (C).

7. A process according to claim 1 further comprising recovering product sulfuric acid from said NOx-lean sulfuric acid.

8. A process according to claim 1 wherein said gaseous feed stream of carbon dioxide is formed by combustion.

9. A process for treating gaseous carbon dioxide, comprising
    (A) providing a gaseous feed stream of carbon dioxide that also comprises NOx and sulfur dioxide, and that is at a pressure of at least 2 bar;
    (B) converting NO in NOx-rich sulfuric acid formed in one or both of steps (D) and (E) to $NO_2$, and desorbing $NO_2$ from said NOx-rich sulfuric acid to form NOx-lean sulfuric acid and desorbed $NO_2$;
    (C) controlling the amount of desorbed $NO_2$ fed to step (D) by converting desorbed $NO_2$ to nitric acid and NO, and recovering said nitric acid;
    (D) reacting water and oxygen with NOx and sulfur dioxide in said feed stream and desorbed $NO_2$ to form NOx-rich sulfuric acid and $SO_2$-depleted NOx-containing carbon dioxide;
    (E) absorbing NOx from said $SO_2$-depleted NOx-containing carbon dioxide into said NOx-lean sulfuric acid to form NOx-rich sulfuric acid and NOx-lean $SO_2$-depleted carbon dioxide;
    (F) subjecting the NOx-lean $SO_2$-depleted carbon dioxide to a subambient-temperature recovery process, employing refrigeration provided by expansion of at least one liquid carbon dioxide product stream formed by said recovery process, to produce at least one gaseous carbon dioxide product stream and at least one gaseous carbon dioxide-containing vent stream;
    (G) separating the vent stream into a carbon dioxide-rich stream and a carbon dioxide-depleted stream, by pressure swing adsorption or by physical or chemical absorption; and (H) recycling said carbon dioxide-rich stream to said carbon dioxide-containing feed stream.

10. A process according to claim 9 wherein in step (F) said refrigeration is provided only by expansion of said at least one liquid carbon dioxide product stream formed by said subambient-temperature recovery process.

11. A process according to claim 9 wherein NOx is absorbed in step (E) into NOx-lean sulfuric acid formed in step (B).

12. A process according to claim 9 further comprising recovering product sulfuric acid from said NOx-lean sulfuric acid.

13. A process according to claim 9 wherein said gaseous feed stream of carbon dioxide is formed by combustion.

14. A process for treating gaseous carbon dioxide, comprising
   (A) providing a gaseous feed stream of carbon dioxide that also comprises NOx and sulfur dioxide, and that is at a pressure of at least 2 bar;
   (B) contacting NOx-rich sulfuric acid with said gaseous feed stream to strip NOx from said NOx-rich sulfuric acid and form NOx-reduced sulfuric acid and NOx-augmented gaseous carbon dioxide that comprises $SO_2$ and $NO_2$;
   (C) reacting water and oxygen with the NOx-augmented gaseous carbon dioxide to form NOx-rich sulfuric acid and $SO_2$-depleted NOx-containing gaseous carbon dioxide;
   (D) absorbing NOx from said $SO_2$-depleted NOx-containing gaseous carbon dioxide into one or both of NOx-reduced sulfuric acid and NOx-lean sulfuric acid to form NOx-rich sulfuric acid and NOx-lean $SO_2$-depleted gaseous carbon dioxide;
   (E) subjecting the NOx-lean $SO_2$-depleted carbon dioxide to a subambient-temperature recovery process, employing refrigeration provided by expansion of at least one liquid carbon dioxide product stream formed by said recovery process, to produce at least one gaseous carbon dioxide product stream and at least one gaseous carbon dioxide-containing vent stream;
   (F) separating the vent stream into a carbon dioxide-rich stream and a carbon dioxide-depleted stream, by pressure swing adsorption or by physical or chemical absorption; and
   (G) recycling said carbon dioxide-rich stream to said carbon dioxide-containing feed stream.

15. Apparatus for treating gaseous carbon dioxide, comprising
   (A) a stripping unit in which NOx-rich sulfuric acid can be contacted with a gaseous feed stream of carbon dioxide that also comprises NOx and sulfur dioxide, and that is at a pressure of at least 2 bar and with $NO_2$ to strip NOx from said NOx-rich sulfuric acid and form NOx-reduced sulfuric acid and NOx-augmented gaseous carbon dioxide that comprises $SO_2$ and $NO_2$;
   (B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$;
   (C) a nitric acid formation unit coupled to said converting unit to receive desorbed $NO_2$ therefrom and to convert said received desorbed $NO_2$ to nitric acid and NO;
   (D) a reactor coupled to said stripping unit to receive said NOx-augmented gaseous carbon dioxide therefrom and react it with water and oxygen to form NOx-rich sulfuric acid and $SO_2$-depleted NOx-containing gaseous carbon dioxide;
   (E) an absorber coupled to said reactor to receive $SO_2$-depleted NOx-containing gaseous carbon dioxide therefrom and absorb NOx from said $SO_2$-depleted NOx-containing carbon dioxide into one or both of said NOx-reduced sulfuric acid and said NOx-lean sulfuric acid to form NOx-rich sulfuric acid and NOx-lean $SO_2$-depleted gaseous carbon dioxide;
   (F) a subambient-temperature recovery unit coupled to said absorber to receive said NOx-lean $SO_2$-depleted carbon dioxide therefrom to produce at least one gaseous carbon dioxide product stream and at least one gaseous carbon dioxide-containing vent stream employing refrigeration provided by expansion of at least one liquid carbon dioxide product stream formed by said recovery unit;
   (G) a vent stream separation unit coupled to said subambient-temperature recovery unit to receive said vent stream therefrom and separate said vent stream into a carbon dioxide-rich stream and a carbon dioxide-depleted stream, by pressure swing adsorption or by physical or chemical absorption; and wherein said vent stream separation unit is coupled to said carbon dioxide-containing feed stream to feed said carbon dioxide-rich stream to said carbon dioxide-containing feed stream.

16. Apparatus for treating gaseous carbon dioxide, comprising
   (A) a stripping unit in which NOx-rich sulfuric acid can be contacted with a gaseous feed stream of carbon dioxide that also comprises NOx and sulfur dioxide, and that is at a pressure of at least 2 bar and with $NO_2$ desorbed in the converting unit (B) to strip NOx from said NOx-rich sulfuric acid and form NOx-reduced sulfuric acid and NOx-augmented gaseous carbon dioxide that comprises $SO_2$ and $NO_2$;
   (B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$, and which is coupled to said stripping unit to feed desorbed $NO_2$ to said stripping unit;
   (C) a nitric acid formation unit coupled to said converting unit to receive desorbed $NO_2$ therefrom and to convert said received desorbed $NO_2$ to nitric acid and NO;
   (D) a reactor coupled to said stripping unit to receive said NOx-augmented gaseous carbon dioxide therefrom and react it with water and oxygen to form NOx-rich sulfuric acid and $SO_2$-depleted NOx-containing gaseous carbon dioxide; and
   (E) an absorber coupled to said reactor to receive $SO_2$-depleted NOx-containing gaseous carbon dioxide therefrom and absorb NOx from said $SO_2$-depleted NOx-containing carbon dioxide into one or both of said NOx-reduced sulfuric acid and said NOx-lean sulfuric acid to form NOx-rich sulfuric acid and NOx-lean $SO_2$-depleted gaseous carbon dioxide.
   (F) a subambient-temperature recovery unit coupled to said absorber to receive said NOx-lean $SO_2$-depleted carbon dioxide therefrom to produce at least one gaseous carbon dioxide product stream and at least one gaseous carbon dioxide-containing vent stream employing refrigeration provided by expansion of at least one liquid carbon dioxide product stream formed by said recovery unit;

(G) a vent stream separation unit coupled to said subambient-temperature recovery unit to receive said vent stream therefrom and separate said vent stream into a carbon dioxide-rich stream and a carbon dioxide-depleted stream, by pressure swing adsorption or by physical or chemical absorption; and wherein said vent stream separation unit is coupled to said carbon dioxide-containing feed stream to feed said carbon dioxide-rich stream to said carbon dioxide-containing feed stream.

17. Apparatus for treating gaseous carbon dioxide, comprising
(A) a converting unit to receive NOx-rich sulfuric acid therefrom which can catalytically convert NO in said NOx-rich sulfuric acid to $NO_2$ and desorb said $NO_2$ from said NOx-rich sulfuric acid to form NOx-lean sulfuric acid and desorbed $NO_2$;
(B) a nitric acid formation unit coupled to said converting unit to receive desorbed $NO_2$ therefrom and to convert said received desorbed $NO_2$ to nitric acid and NO;
(C) a reactor to receive $NO_2$ desorbed in unit (A) and gaseous carbon dioxide that contains NOx and sulfur dioxide, and to react NOx and sulfur dioxide in said carbon dioxide with water and oxygen and said desorbed NOx to form NOx-rich sulfuric acid and $SO_2$-depleted NOx-containing gaseous carbon dioxide; and
(D) an absorber coupled to said reactor to receive $SO_2$-depleted NOx-containing gaseous carbon dioxide therefrom and absorb NOx from said $SO_2$-depleted NOx-containing carbon dioxide into one said NOx-lean sulfuric acid to form NOx-rich sulfuric acid and NOx-lean $SO_2$-depleted gaseous carbon dioxide;
(E) a subambient-temperature recovery unit coupled to said absorber to receive said NOx-lean $SO_2$-depleted carbon dioxide therefrom to produce at least one gaseous carbon dioxide product stream and at least one gaseous carbon dioxide-containing vent stream employing refrigeration provided by expansion of at least one liquid carbon dioxide product stream formed by said recovery unit;
(F) a vent stream separation unit coupled to said subambient-temperature recovery unit to receive said vent stream therefrom and separate said vent stream into a carbon dioxide-rich stream and a carbon dioxide-depleted stream, by pressure swing adsorption or by physical or chemical absorption; and wherein said vent stream separation unit is coupled to said carbon dioxide-containing feed stream to feed said carbon dioxide-rich stream to said carbon dioxide-containing feed stream.

* * * * *